United States Patent
Qu et al.

(10) Patent No.: US 10,992,405 B2
(45) Date of Patent: Apr. 27, 2021

(54) SIGNAL TRANSMISSION METHOD, SIGNAL RECEIVING METHOD, AND DEVICE

(71) Applicant: HUAWEI TECHNOLOGIES CO., LTD., Guangdong (CN)

(72) Inventors: Bingyu Qu, Beijing (CN); Xueru Li, Beijing (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 16/522,140

(22) Filed: Jul. 25, 2019

(65) Prior Publication Data

US 2019/0349109 A1 Nov. 14, 2019

Related U.S. Application Data

(63) Continuation of application No. PCT/CN2018/074043, filed on Jan. 24, 2018.

(30) Foreign Application Priority Data

Jan. 26, 2017 (CN) .......................... 201710064247.3

(51) Int. Cl.
*H04L 27/26* (2006.01)
*H04J 13/00* (2011.01)
*H04J 13/16* (2011.01)
*H04J 11/00* (2006.01)

(52) U.S. Cl.
CPC ............. *H04J 13/004* (2013.01); *H04J 11/00* (2013.01); *H04J 13/16* (2013.01); *H04J 2011/0006* (2013.01); *H04J 2013/165* (2013.01)

(58) Field of Classification Search
None
See application file for complete search history.

(56) References Cited

U.S. PATENT DOCUMENTS

| | | |
|---|---|---|
| 2010/0284350 A1 | 11/2010 | Korhonen et al. |
| 2011/0150156 A1 | 6/2011 | Xue et al. |
| 2018/0049237 A1 | 2/2018 | Guo et al. |

FOREIGN PATENT DOCUMENTS

| | | |
|---|---|---|
| AU | 2014200534 A1 | 2/2014 |
| CN | 101336003 A | 12/2008 |
| CN | 101345577 A | 1/2009 |
| CN | 101841507 A | 9/2010 |
| CN | 102316601 A | 1/2012 |
| CN | 102340472 A | 2/2012 |
| CN | 106358296 A | 1/2017 |
| EP | 1971097 A2 | 9/2008 |
| WO | 2016169062 A1 | 10/2016 |

*Primary Examiner* — Ruihua Zhang
(74) *Attorney, Agent, or Firm* — Womble Bond Dickinson (US) LLP

(57) ABSTRACT

Embodiments of the present invention disclose a signal receiving method, a signal transmission method, and a device, and relate to the communications field, so as to resolve a problem that a supported quantity of UEs that perform orthogonal code division multiplexing through cyclic shifts is relatively small when a frequency deviation between a center frequency for receiving a signal by UE and a center frequency for transmitting a signal by a base station is greater than a subcarrier spacing used for communication between the base station and the UE. The embodiments of the present invention are used in a signal transmission process.

20 Claims, 6 Drawing Sheets

Base station 11

UE 12

SIGNAL TRANSMISSION METHOD, SIGNAL RECEIVING METHOD, AND DEVICE

CROSS-REFERENCE TO RELATED APPLICATIONS

This application is a continuation of International Application No. PCT/CN2018/074043, filed on Jan. 24, 2018, which claims priority to Chinese Patent Application No. 201710064247.3, filed on Jan. 26, 2017. The disclosures of the aforementioned applications are hereby incorporated by reference in their entireties.

TECHNICAL FIELD

Embodiments of the present invention relate to the communications field, and in particular, to a signal transmission method, a signal receiving method, and a device.

BACKGROUND

In a wireless communications system, user equipment (UE) sends a pilot sequence to a base station, and the base station may learn channel state information of the UE by detecting the pilot sequence, and detect, by using the channel state information, data sent by the UE. A ZC (Zadoff-Chu) sequence is a constant-amplitude zero-autocorrelation sequence. A time-domain sequence obtained by modulating a sequence generated based on the ZC sequence to a frequency domain and then performing inverse discrete Fourier transform (IDFT) has a relatively low peak-to-average power ratio (PAPR). Therefore, using the sequence generated based on the ZC sequence as the pilot sequence instead of using a sequence with a relatively high peak-to-average power ratio helps improve a transmitter power efficiency of the UE. The sequence generated based on the ZC sequence may be the ZC sequence itself, or a sequence generated by truncating or cyclically extending the ZC sequence. Currently, the ZC sequence has been widely applied to a long term evolution (LTE) wireless communications system as a pilot sequence. Specifically, the ZC sequence may be applied to an uplink signal in LTE. For example, the sequence generated based on the ZC sequence is used as an uplink sounding reference signal (SRS) or an uplink demodulation reference signal (DMRS). The sequence generated based on the ZC sequence may be alternatively used as a modulation sequence of an uplink control channel. To be specific, sequence modulation is performed on to-be-sent symbols by using the sequence generated based on the ZC sequence, and information obtained through sequence modulation is carried on a time-frequency resource of the uplink control channel. In the LTE system, the ZC sequence may also be used to generate a preamble. The preamble is used by UE to initiate uplink random access, so that a base station obtains uplink timing information of the UE. This helps the UE achieve uplink synchronization.

One frequency-domain ZC sequence may be determined based on one root indicator. Further, different sequences may be obtained by performing different cyclic shifts on a sequence generated based on the ZC sequence. Performing a cyclic shift on a sequence generated based on one frequency-domain ZC sequence means performing a (time-domain) cyclic shift on a time-domain sequence obtained by performing IDFT transform on the sequence generated based on the ZC sequence. Assuming that a sequence $z(n)$ ($n=0, \ldots, N-1$) represents a frequency-domain sequence whose length is N and that is generated based on a ZC sequence, it can be learned, from a property of a sequence generated based on a ZC sequence, that IDFT transform is first performed on the frequency-domain sequence $z(n)$ ($n=0, \ldots, N-1$) to obtain a corresponding time-domain sequence, and then l units of cyclic shifts are performed on the time-domain sequence. This is equivalent to first performing phase rotation on the sequence $z(n)$ in frequency domain to obtain a sequence $z(n) \cdot e^{j2\pi nl/N}$, ($n=0, 1, 2, \ldots, N-1$) and then performing IDFT transform on the sequence $z(n) \cdot e^{j2\pi nl/N}$, ($n=0, 1, 2, \ldots, N-1$) obtained through phase rotation. l is a real number. For a same generated sequence, when two cyclic shift values ($l_1, l_2$) satisfy $l_1 \bmod N \neq l_2 \bmod N$, two (time-domain) sequences obtained by separately performing cyclic shifts on the generated sequence based on the cyclic shift values $l_1$ and $l_2$ are orthogonal, where mod is a modulo operator, and a remainder obtained through mod N ranges from 0 to N−1. Therefore, in the prior art, a base station may allocate a root indicator of a same ZC sequence to different UEs, and also allocate cyclic shift values ($l_1, l_2$) satisfying $l_1 \bmod N \neq l_2 \bmod N$. In this way, the different UEs can transmit, on a same time-frequency-domain resource, sequences generated based on the root indicator of the same ZC sequence and the cyclic shift values allocated by the base station to the UEs, for example, uplink SRSs, uplink DMRSs, or modulation sequences or preambles of uplink control channels, without generating inter-user interference. This implements multiplexing of a plurality of UEs on a same time-frequency-domain resource.

The prior art has at least the following problem: In an actual application scenario, there is a frequency deviation between a center frequency for receiving a signal by UE and a center frequency for transmitting a signal by a base station. When the frequency deviation is greater than a subcarrier spacing used for communication between the base station and the UE, the frequency deviation results in an additional time-domain cyclic shift on a sequence obtained based on a root indicator allocated by the base station to the UE. Therefore, the base station needs to reserve more cyclic shift values for the UE. In this case, when the frequency deviation is greater than the subcarrier spacing used for communication between the base station and the UE, to ensure that no interference is generated between different UEs that transmit sequences by using a same time-frequency-domain resource, a quantity of cyclic shift values that can be allocated is reduced, that is, a supported quantity of UEs that perform orthogonal code division multiplexing through cyclic shifts is relatively small. As a result, uplink resource utilization is reduced.

SUMMARY

Embodiments of the present invention provide a signal transmission method, a signal receiving method, and a device, so as to resolve a problem that a supported quantity of UEs that perform orthogonal code division multiplexing through cyclic shifts is relatively small when a frequency deviation between a center frequency for receiving a signal by UE and a center frequency for transmitting a signal by a base station is greater than a subcarrier spacing used for communication between the base station and the UE.

To achieve the foregoing objective, the following technical solutions are used in the embodiments of the present invention:

According to a first aspect of the embodiments of the present invention, a signal receiving method is provided, including:

determining, by a base station, a target root indicator from a sequence indicator set, where the sequence indicator set is $\{A_1, B_1, A_2, B_2, L, A_s, B_s\}$. $A_i$=i(mod K), $B_i$=−i(mod K), $A_i$ and $B_i$ and are root indicators of ZC sequences, i is an integer greater than or equal to 1 and less than or equal to s, s is an integer greater than or equal to 1 and less than or equal to $\lfloor K/2 \rfloor -1$, $\lfloor \; \rfloor$ indicates rounding down, and K is a length of a ZC sequence; generating, by the base station, a signal sequence based on the target root indicator; receiving, by the base station, an uplink signal; and processing, by the base station, the uplink signal based on the signal sequence.

According to one embodiment of the present invention, the base station generates the signal sequence based on the target root indicator determined from the sequence indicator set, and processes the received uplink signal based on the generated signal sequence. The sequence indicator set is $\{A_1, B_1, A_2, B_2, L, A_s, B_s\}$, s is an integer greater than or equal to 1 and less than or equal to $\lfloor K/2 \rfloor -1$, and the sequence indicator set does not include $\lfloor K/2 \rfloor$ or K−$\lfloor K/2 \rfloor$, or s is a positive integer less than $\lfloor K/2 \rfloor -1$ among integers greater than or equal to 1 and less than or equal to $\lfloor K/2 \rfloor -1$. This resolves the problem that a supported quantity of UEs that perform orthogonal code division multiplexing through cyclic shifts is relatively small when a frequency deviation between a center frequency for receiving a signal by UE and a center frequency for transmitting a signal by a base station is greater than a subcarrier spacing used for communication between the base station and the UE.

In one embodiment, the signal sequence is a sequence generated based on a target ZC sequence, and a root indicator of the target ZC sequence is the target root indicator.

In one embodiment, s is predefined; or the information receiving method may further include: sending, by the base station, first signaling, where the first signaling includes s.

In one embodiment, the signal receiving method may further include: sending, by the base station, second signaling to UE, where the second signaling includes a cyclic shift value, and the cyclic shift value is correlated with the UE.

In one embodiment, the generating, by the base station, a signal sequence based on the target root indicator may specifically include: generating, by the base station, the signal sequence based on the target root indicator and the cyclic shift value.

In one embodiment, the signal receiving method may further include: sending, by the base station, third signaling to UE, where the third signaling includes information about a cyclic shift value, and the information about the cyclic shift value is correlated with the UE.

In one embodiment, the cyclic shift value is determined based on a cyclic shift value set, and an interval between any two cyclic shift values in the cyclic shift value set is greater than or equal to D, where D is a positive real number satisfying $$\left(2qn\frac{N}{K} + \tau\right) \leq D,$$

τ is a positive real number, n is a positive integer, q is a positive integer less than or equal to s, $A_q$ or $B_q$ is the target root indicator, and N is a length of a sequence of the uplink signal.

In one embodiment, τ is predefined; or the signal receiving method may further include: sending, by the base station, fourth signaling, where the fourth signaling includes τ.

In one embodiment, n is predefined; or the signal receiving method may further include: sending, by the base station, fifth signaling, where the fifth signaling includes n.

In one embodiment, the signal receiving method may further include: sending, by the base station, sixth signaling, where the sixth signaling includes D.

With reference to the first aspect and the foregoing possible implementation, in another possible implementation, the uplink signal is a signal of an uplink control channel or an uplink reference signal.

According to a second aspect of the embodiments of the present invention, a signal transmission method is provided, including:

determining, by UE, a target root indicator from a sequence indicator set, where the sequence indicator set is $\{A_1, B_1, A_2, B_2, L, A_s, B_s\}$, $A_i$=i(mod K), $B_i$=−i(mod K) A and $B_i$ are root indicators of ZC sequences, i is an integer greater than or equal to 1 and less than or equal to s, s is an integer greater than or equal to 1 and less than or equal to $\lfloor K/2 \rfloor -1$, $\lfloor \; \rfloor$ indicates rounding down, and K is a length of a ZC sequence; generating, by the UE, an uplink signal based on the target root indicator; and sending, by the UE, the uplink signal.

According to one embodiment of the present invention, the UE generates the uplink signal based on the target root indicator determined from the sequence indicator set, and sends the uplink signal. The sequence indicator set is $\{A_1, B_1, A_2, B_2, L, A_s, B_s\}$, s is an integer greater than or equal to 1 and less than or equal to s, and the sequence indicator set does not include $\lfloor K/2 \rfloor$ or K−$\lfloor K/2 \rfloor$, or s is a positive integer less than $\lfloor K/2 \rfloor -1$ among integers greater than or equal to 1 and less than or equal to $\lfloor K/2 \rfloor -1$. This resolves the problem that a supported quantity of UEs that perform orthogonal code division multiplexing through cyclic shifts is relatively small when a frequency deviation between a center frequency for receiving a signal by UE and a center frequency for transmitting a signal by a base station is greater than a subcarrier spacing used for communication between the base station and the UE.

In one embodiment, a sequence of the uplink signal is a sequence generated based on a target ZC sequence, and a root indicator of the target ZC sequence is the target root indicator.

In one embodiment, s is predefined; or the signal transmission method may further include: receiving, by the UE, first signaling, where the first signaling includes s; and determining, by the UE, the sequence indicator set based on the first signaling.

In one embodiment, the signal transmission method may further include: receiving, by the UE, second signaling, where the second signaling includes a cyclic shift value, and the cyclic shift value is correlated with the UE.

In one embodiment, the generating, by the UE, an uplink signal based on the target root indicator may specifically include: generating, by the UE, the uplink signal based on the target root indicator and the cyclic shift value.

In one embodiment, the signal transmission method may further include: receiving, by the UE, third signaling, where the third signaling includes information about a cyclic shift value, and the information about the cyclic shift value is correlated with the UE.

In one embodiment, the cyclic shift value is determined based on a cyclic shift value set, and an interval between any two cyclic shift values in the cyclic shift value set is greater than or equal to D, where D is a positive real number satisfying $$\left(2qn\frac{N}{K}+\tau\right)\leq D,$$

$\tau$ is a positive real number, n is a positive integer, q is a positive integer less than or equal to s, $A_q$ or $B_q$ is the target root indicator, and N is a length of a sequence of the uplink signal.

In one embodiment, $\tau$ is predefined; or the signal transmission method may further include: receiving, by the UE, fourth signaling, where the fourth signaling includes $\tau$; and determining, by the UE, a cyclic shift value based on $\tau$, q, and n; and the generating an uplink signal based on the target root indicator includes: generating the uplink signal based on the cyclic shift value and the target root indicator.

In one embodiment, n is predefined; or the signal transmission method may further include: receiving, by the UE, fifth signaling, where the fifth signaling includes n; and determining, by the UE, a cyclic shift value based on $\tau$, q, and n; and the generating an uplink signal based on the target root indicator includes: generating the uplink signal based on the cyclic shift value and the target root indicator.

In one embodiment, the signal transmission method may further include: receiving, by the UE, sixth signaling, where the sixth signaling includes D; and determining, by the UE, a cyclic shift value based on D; and the generating an uplink signal based on the target root indicator includes: generating the uplink signal based on the cyclic shift value and the target root indicator.

In one embodiment, the uplink signal is a signal of an uplink control channel or an uplink reference signal.

According to a third aspect of the embodiments of the present invention, a signal transmission method is provided, including:

determining, by UE, a root indicator q; generating, by the UE, an uplink signal based on q and a cyclic shift value, where the cyclic shift value is determined by the UE based on a cyclic shift value set, and the cyclic shift value set is as follows:

$$\left\{(\alpha_0)\mathrm{mod}N,(\alpha_0+D)\mathrm{mod}N,\ldots,\left(\alpha_0+\left(\left\lfloor\frac{N}{D}\right\rfloor-1\right)D\right)\mathrm{mod}N\right\}$$

where the cyclic shift value set is determined based on q, D is a positive real number, $\alpha_0$ is a real number and is initial cyclic shift information, $\lfloor\ \rfloor$ indicates rounding down, and N is a length of a sequence of the uplink signal; and sending, by the UE, the uplink signal.

In one embodiment of the present invention, there is no value limitation that a root indicator q of a ZC sequence used to generate a preamble needs to be greater than a value. For example, in the prior art, a root indicator of a ZC sequence used to generate a preamble needs to be greater than a maximum delay spread. Therefore, in this embodiment, a quantity of available root indicators is increased, thereby increasing a quantity of preambles. For example, in the prior art, when it is considered that there is a frequency deviation between a base station and UE, q=1 cannot be used. However, in the method in this embodiment of the present invention, even if there is a frequency deviation between a base station and the UE, q=1 can be used. Usually, a root indicator q or K−q of a ZC sequence corresponding to a q value that is a relatively small positive integer may be selected. In addition, for a selected root indicator q, a cyclic shift value that can be used by the UE and a cyclic shift value that can be allocated by the base station are determined based on the set $$\left\{(\alpha_0)\mathrm{mod}N,(\alpha_0+D)\mathrm{mod}N,\ldots,\left(\alpha_0+\left(\left\lfloor\frac{N}{D}\right\rfloor-1\right)D\right)\mathrm{mod}N\right\},$$

where D is a value determined based on q. Properly determining a value of D based on q can ensure that cyclic shifts of the UE resulting from a frequency deviation and a delay spread can fall within a cyclic shift interval allocated by the base station, without occupying an additional cyclic shift beyond the cyclic shift interval allocated by the base station. This can ensure that there is no inter-user interference. However, in the prior art, selection of a root indicator q needs to meet a value limitation that the root indicator q is greater than a value. In addition, for a root indicator q selected in such a way, only some of elements in the set can be selected as available cyclic shift values, to ensure that there is no inter-user interference. Therefore, according to the method in this embodiment of the present invention, a quantity of available cyclic shift values is increased, thereby further increasing a quantity of preamble sequences.

In one embodiment, the signal transmission method may further include: receiving, by the UE, first signaling, where the first signaling includes D corresponding to q; and determining, by the UE, the cyclic shift value set based on D and q.

In one embodiment, different q is corresponding to different D.

In one embodiment, the signal transmission method may further include: receiving, by the UE, second signaling, where the second signaling includes a maximum delay spread $\tau$; and determining, by the UE, the cyclic shift value set based on q and $\tau$, where D used to determine the cyclic shift value set is a positive real number satisfying $$\left(2(q\mathrm{mod}K)n\frac{N}{K}+\tau\right)\leq D,$$

or D used to determine the cyclic shift value set is a positive real number satisfying $$\left(2((K-(q\mathrm{mod}K)))n\frac{N}{K}+\tau\right)\leq D,$$

where $\tau$ is a positive real number, n is a positive integer, and K is a length of a ZC sequence.

In one embodiment, the signal transmission method may further include: receiving, by the UE, third signaling, where the third signaling includes the cyclic shift value set.

In one embodiment, the signal transmission method may further include: receiving, by the UE, fourth signaling, where the fourth signaling includes the initial cyclic shift information.

In one embodiment, q belongs to a set $\{A_1, B_1, A_2, B_2\}$, $A_i$=i(mod K), $B_i$=−i(mod K), and i is 1 or 2.

According to a fourth aspect of the embodiments of the present invention, a signal receiving method is provided, including:

determining, by a base station, a root indicator q; generating, by the base station, a signal sequence based on q and a cyclic shift value, where the cyclic shift value is determined by the base station based on a cyclic shift value set, and the cyclic shift value set is as follows:

$$\left\{(\alpha_0) \bmod N, (\alpha_0 + D) \bmod N, \ldots, \left(\alpha_0 + \left(\left\lfloor \frac{N}{D} \right\rfloor - 1\right)D\right) \bmod N\right\}$$

where the cyclic shift value set is determined based on q, D is a positive real number, $\alpha_0$ is a real number and is initial cyclic shift information, $\lfloor \ \rfloor$ indicates rounding down, and N is a length of a sequence of an uplink signal; receiving, by the base station, the uplink signal; and processing, by the base station, the uplink signal based on the signal sequence.

In one embodiment of the present invention, there is no value limitation that a root indicator q of a ZC sequence used to generate a preamble needs to be greater than a value. For example, in the prior art, a root indicator of a ZC sequence used to generate a preamble needs to be greater than a maximum delay spread. Therefore, in this embodiment, a quantity of available root indicators is increased, thereby increasing a quantity of preambles. For example, in the prior art, when it is considered that there is a frequency deviation between a base station and UE, q=1 cannot be used. However, in the method in this embodiment of the present invention, even if there is a frequency deviation between the base station and UE, q=1 can be used. Usually, a root indicator q or K−q of a ZC sequence corresponding to a q value that is a relatively small positive integer may be selected. In addition, for a selected root indicator q, a cyclic shift value that can be used by the UE and a cyclic shift value that can be allocated by the base station are determined based on the set $$\left\{(\alpha_0) \bmod N, (\alpha_0 + D) \bmod N, \ldots, \left(\alpha_0 + \left(\left\lfloor \frac{N}{D} \right\rfloor - 1\right)D\right) \bmod N\right\},$$

where D is a value determined based on q. Properly determining a value of D based on q can ensure that cyclic shifts of the UE resulting from a frequency deviation and a delay spread can fall within a cyclic shift interval allocated by the base station, without occupying an additional cyclic shift beyond the cyclic shift interval allocated by the base station. This can ensure that there is no inter-user interference. However, in the prior art, selection of a root indicator q needs to meet a value limitation that the root indicator q is greater than a value. In addition, for a root indicator q selected in such a way, only some of elements in the set can be selected as available cyclic shift values, to ensure that there is no inter-user interference. Therefore, in this embodiment, a quantity of available cyclic shift values is increased, thereby further increasing a quantity of preamble sequences.

In one embodiment, the signal receiving method may further include: sending, by the base station, first signaling, where the first signaling includes D corresponding to q.

In one embodiment, different q is corresponding to different D.

In one embodiment, the signal receiving method may further include: sending, by the base station, second signaling, where the second signaling includes τ, τ is used by the UE to determine the cyclic shift value set, and D used to determine the cyclic shift value set is a positive real number satisfying $$\left(2(q \bmod K)n\frac{N}{K} + \tau\right) \leq D,$$

or D used to determine the cyclic shift value set is a positive real number satisfying $$\left(2((K - (q \bmod K)))n\frac{N}{K} + \tau\right) \leq D,$$

where τ is a positive real number, n is a positive integer, and K is a length of a ZC sequence.

In one embodiment, the signal receiving method may further include: sending, by the base station, third signaling, where the third signaling includes the cyclic shift value set.

In one embodiment, the signal receiving method may further include: sending, by the base station, fourth signaling, where the fourth signaling includes the initial cyclic shift information.

In one embodiment, q belongs to a set $\{A_1, B_1, A_2, B_2\}$, $A_i = i(\bmod K)$, $B_i = -i(\bmod K)$, and i is 1 or 2.

According to a fifth aspect of the embodiments of the present invention, a base station is provided, including:

a determining unit, configured to determine a target root indicator from a sequence indicator set, where the sequence indicator set is $\{A_1, B_1, A_2, B_2, L, A_s, B_s\}$, $A_i = i(\bmod K)$ $B_i = -i(\bmod K)$, $A_i$ and $B_i$ are root indicators of ZC sequences, i is an integer greater than or equal to 1 and less than or equal to s, s is an integer greater than or equal to 1 and less than or equal to $\lfloor K/2 \rfloor - 1$, $\lfloor \ \rfloor$ indicates rounding down, and K is a length of a ZC sequence; a generation unit, configured to generate a signal sequence based on the target root indicator determined by the determining unit; a receiving unit, configured to receive an uplink signal; and a processing unit, configured to process, based on the signal sequence generated by the generation unit, the uplink signal received by the receiving unit.

In one embodiment, the signal sequence is a sequence generated based on a target ZC sequence, and a root indicator of the target ZC sequence is the target root indicator.

In one embodiment, s is predefined; or the base station further includes a sending unit, configured to send first signaling, where the first signaling includes s.

In one embodiment, the sending unit is further configured to send second signaling to user equipment UE, where the second signaling includes a cyclic shift value, and the cyclic shift value is correlated with the UE.

In one embodiment, the generation unit is specifically configured to generate the signal sequence based on the target root indicator and the cyclic shift value.

In one embodiment, the sending unit is further configured to send third signaling to UE, where the third signaling includes information about a cyclic shift value, and the information about the cyclic shift value is correlated with the UE.

In one embodiment, the cyclic shift value is determined based on a cyclic shift value set, and an interval between any two cyclic shift values in the cyclic shift value set is greater than or equal to D, where D is a positive real number satisfying $$\left(2qn\frac{N}{K}+\tau\right)\leq D,$$

$\tau$ is a positive real number, n is a positive integer, q is a positive integer less than or equal to s, $A_q$ or $B_q$ is the target root indicator, and N is a length of a sequence of the uplink signal.

In one embodiment, $\tau$ is predefined; or the sending unit is further configured to send fourth signaling, where the fourth signaling includes $\tau$.

In one embodiment, n is predefined; or the sending unit is further configured to send fifth signaling, where the fifth signaling includes n.

In one embodiment, the sending unit is further configured to send sixth signaling, where the sixth signaling includes D.

In one embodiment, the uplink signal is a signal of an uplink control channel or an uplink reference signal.

According to a sixth aspect of the embodiments of the present invention, user equipment UE is provided, including:

a determining unit, configured to determine a target root indicator from a sequence indicator set, where the sequence indicator set is $\{A_1, B_1, A_2, B_2, L, A_s, B_s\}$, $A_i$=i(mod K), $B_i$=−i(mod K) $A_i$ and $B_i$ are root indicators of ZC sequences, i is an integer greater than or equal to 1 and less than or equal to s, s is an integer greater than or equal to 1 and less than or equal to $\lfloor K/2 \rfloor -1$, $\lfloor \, \rfloor$ indicates rounding down, and K is a length of a ZC sequence; a generation unit, configured to generate an uplink signal based on the target root indicator determined by the determining unit; and a sending unit, configured to send the uplink signal generated by the generation unit.

In one embodiment, a sequence of the uplink signal is a sequence generated based on a target ZC sequence, and a root indicator of the target ZC sequence is the target root indicator.

In one embodiment, s is predefined; or the UE further includes a receiving unit, configured to receive first signaling, where the first signaling includes s, and the UE determines the sequence indicator set based on the first signaling.

In one embodiment, the UE further includes a receiving unit, configured to receive second signaling, where the second signaling includes a cyclic shift value, and the cyclic shift value is correlated with the UE.

In one embodiment, the generation unit is specifically configured to generate the uplink signal based on the target root indicator and the cyclic shift value.

In one embodiment, the UE further includes a receiving unit, configured to receive third signaling, where the third signaling includes information about a cyclic shift value, and the information about the cyclic shift value is correlated with the UE.

In one embodiment, the cyclic shift value is determined based on a cyclic shift value set, and an interval between any two cyclic shift values in the cyclic shift value set is greater than or equal to D, where D is a positive real number satisfying $$\left(2qn\frac{N}{K}+\tau\right)\leq D,$$

$\tau$ is a positive real number, n is a positive integer, q is a positive integer less than or equal to s, $A_q$ or $B_q$ is the target root indicator, and N is a length of a sequence of the uplink signal.

In one embodiment, $\tau$ is predefined; or the receiving unit is further configured to receive fourth signaling, where the fourth signaling includes $\tau$; the determining unit is further configured to determine a cyclic shift value based on $\tau$, q, and n; and the generation unit is specifically configured to generate the uplink signal based on the cyclic shift value and the target root indicator determined by the determining unit.

In one embodiment, n is predefined; or the receiving unit is further configured to receive fifth signaling, where the fifth signaling includes n; the determining unit is further configured to determine a cyclic shift value based on $\tau$, q, and n; and the generation unit is specifically configured to generate the uplink signal based on the cyclic shift value and the target root indicator determined by the determining unit.

In one embodiment, the receiving unit is further configured to receive sixth signaling, where the sixth signaling includes D; the determining unit is further configured to determine a cyclic shift value based on D received by the receiving unit; and the generation unit is specifically configured to generate the uplink signal based on the cyclic shift value and the target root indicator determined by the determining unit.

In one embodiment, the uplink signal is a signal of an uplink control channel or an uplink reference signal.

According to a seventh aspect of the embodiments of the present invention, user equipment UE is provided, including:

a determining unit, configured to determine a root indicator q; a generation unit, configured to generate an uplink signal based on q determined by the determining unit and a cyclic shift value, where the cyclic shift value is determined by the UE based on a cyclic shift value set, and the cyclic shift value set is $$\left\{(\alpha_0)\bmod N, (\alpha_0+D)\bmod N, \ldots, \left(\alpha_0+\left(\left\lfloor \frac{N}{D} \right\rfloor-1\right)D\right)\bmod N\right\},$$

where the cyclic shift value set is determined based on q, D is a positive real number, $\alpha_0$ is a real number and is initial cyclic shift information, $\lfloor \, \rfloor$ indicates rounding down, and N is a length of a sequence of the uplink signal; and a sending unit, configured to send the uplink signal generated by the generation unit.

In one embodiment, the UE further includes a receiving unit, where the receiving unit is configured to receive first signaling, where the first signaling includes D corresponding to q; and the determining unit is further configured to determine the cyclic shift value set based on D received by the receiving unit and q determined by the determining unit.

In one embodiment, in another possible implementation, different q is corresponding to different D.

In one embodiment, the UE further includes a receiving unit, where the receiving unit is configured to receive second signaling, where the second signaling includes τ; and the determining unit is further configured to determine the cyclic shift value set based on q determined by the determining unit and τ received by the receiving unit, where D used to determine the cyclic shift value set is a positive real number satisfying $$(2(q \bmod K) n \frac{N}{K} + \tau) \le D,$$

or D used to determine the cyclic shift value set is a positive real number satisfying $$(2((K - (q \bmod K))) n \frac{N}{K} + \tau) \le D,$$

where τ is a positive real number, n is a positive integer, and K is a length of a ZC sequence.

In one embodiment, the UE further includes a receiving unit, where the receiving unit is configured to receive third signaling, where the third signaling includes the cyclic shift value set.

In one embodiment, the receiving unit is further configured to receive fourth signaling, where the fourth signaling includes the initial cyclic shift information.

With reference to the seventh aspect and the foregoing possible implementation, in another possible implementation, q belongs to a set $\{A_1, B_1, A_2, B_2\}$, $A_i$=i (mod K), $B_i$=−i(mod K), and i is 1 or 2.

According to an eighth aspect of the embodiments of the present invention, a base station is provided, including:

a determining unit, configured to determine a root indicator q; a generation unit, configured to generate a signal sequence based on q determined by the determining unit and a cyclic shift value, where the cyclic shift value is determined by the base station based on a cyclic shift value set, and the cyclic shift value set is $$\{(\alpha_0) \bmod N, (\alpha_0 + D) \bmod N, \ldots, (\alpha_0 + (\lfloor \frac{N}{D} \rfloor - 1) D) \bmod N\},$$

where the cyclic shift value set is determined based on q, D is a positive real number, $\alpha_0$ is a real number and is initial cyclic shift information, ⌊ ⌋ indicates rounding down, and N is a length of a sequence of an uplink signal; a receiving unit, configured to receive the uplink signal; and a processing unit, configured to process, based on the signal sequence generated by the generation unit, the uplink signal received by the receiving unit.

In one embodiment, the base station further includes a sending unit, configured to send first signaling, where the first signaling includes D corresponding to q.

In one embodiment, different q is corresponding to different D.

In one embodiment, the base station further includes a sending unit, configured to send second signaling, where the second signaling includes τ, τ is used by user equipment UE to determine the cyclic shift value set, and D used to determine the cyclic shift value set is a positive real number satisfying $$(2(q \bmod K) n \frac{N}{K} + \tau) \le D,$$

or D used to determine the cyclic shift value set is a positive real number satisfying $$(2((K - (q \bmod K))) n \frac{N}{K} + \tau) \le D,$$

where τ is a positive real number, n is a positive integer, and K is a length of a ZC sequence.

In one embodiment, the base station further includes a sending unit, configured to send third signaling, where the third signaling includes the cyclic shift value set.

In one embodiment, the sending unit is further configured to send fourth signaling, where the fourth signaling includes the initial cyclic shift information.

In one embodiment, q belongs to a set $\{A_1, B_1, A_2, B_2\}$, $A_i$=i(mod K), $B_i$=−i(mod K), and i is 1 or 2.

According to a ninth aspect of the embodiments of the present invention, a base station is provided. The base station may include at least one processor, a memory, a transceiver, and a bus.

The at least one processor is connected to the memory and the transceiver by using a communications bus. The memory is configured to store a computer executable instruction. When the base station runs, the processor executes the computer executable instruction stored in the memory, so that the base station performs the signal receiving method according to any one of the first aspect or the possible implementations of the first aspect, or any one of the fourth aspect or the possible implementations of the fourth aspect.

According to a tenth aspect of the embodiments of the present invention, UE is provided. The UE may include at least one processor, a memory, a transceiver, and a bus.

The at least one processor is connected to the memory and the transceiver by using a communications bus. The memory is configured to store a computer executable instruction. When the UE runs, the processor executes the computer executable instruction stored in the memory, so that the UE performs the signal transmission method according to any one of the second aspect or the possible implementations of the second aspect, or any one of the third aspect or the possible implementations of the third aspect.

According to an eleventh aspect of the embodiments of the present invention, a computer storage medium is provided, and is configured to store a computer software instruction used by the foregoing base station. The computer software instruction includes a program designed for performing the foregoing signal receiving method.

According to a twelfth aspect of the embodiments of the present invention, a computer storage medium is provided, and is configured to store a computer software instruction used by the foregoing UE. The computer software instruction includes a program designed for performing the foregoing signal transmission method.

DESCRIPTION OF EMBODIMENTS

Figure 1:
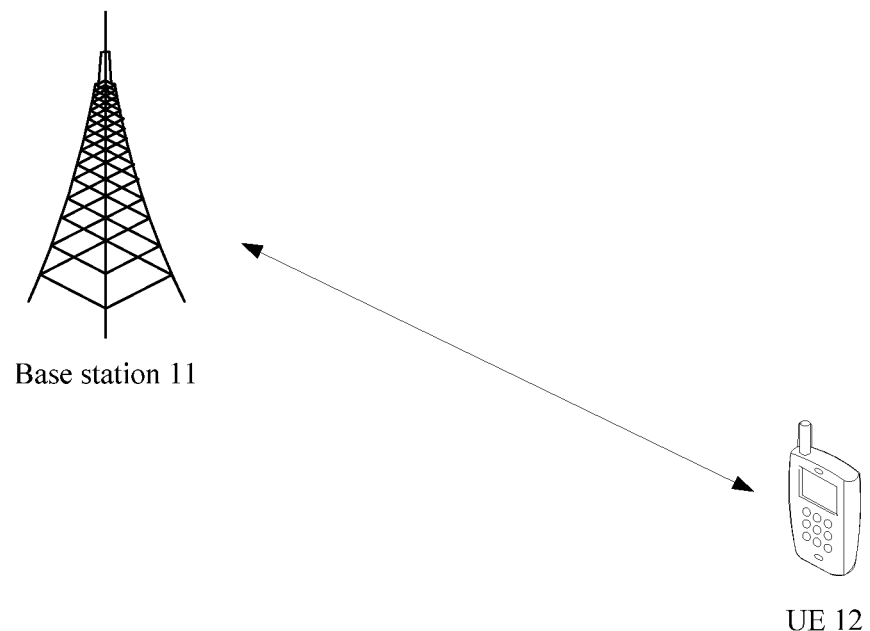
FIG. 1 is a simplified schematic diagram of a system architecture to which an embodiment of the present invention is applied according to an embodiment of the present invention.

A base station may allocate a root indicator of a same ZC sequence to different UEs, and also allocate cyclic shift values ($l_1$, $l_2$) satisfying $l_1$ mod N≠$l_2$ mod N, so as to implement multiplexing of a plurality of UEs on a same time-frequency-domain resource. However, in an actual application scenario, there is a frequency deviation between a center frequency for receiving a signal by UE and a center frequency for transmitting a signal by a base station. In addition, when a capability of the UE is relatively poor or the UE is in a high-speed moving state, or in another case (for example, a small subcarrier spacing is used because a long cyclic prefix (CP) is required), the frequency deviation is greater than a subcarrier spacing used for communication between the base station and the UE. This results in an additional time-domain cyclic shift on a sequence obtained based on a root indicator allocated by the base station to the UE. Therefore, the base station needs to reserve more cyclic shift values for the UE.

For example, the base station allocates a root indicator $$q = \frac{N-1}{3}$$

and a cyclic shift value l=0 to UE 1, and predefines a length N=61 of a sequence generated based on a ZC sequence (where a root indicator of the ZC sequence is $$q = \frac{N-1}{3}\Big).$$

When there is a frequency deviation of τ=±1 subcarrier spacings between a center frequency for receiving a signal by the UE 1 and a center frequency for transmitting a signal by the base station, because additional time-domain cyclic shifts resulting from the frequency deviation occupy two cyclic shift locations, the two cyclic shift locations need to be reserved for the UE 1. Therefore, when the base station allocates a cyclic shift value to another UE, the two cyclic shift locations occupied by the additional cyclic shifts resulting from the frequency deviation of the UE 1 can no longer be allocated. As a result, a quantity of cyclic shift values that can be allocated is reduced, that is, a supported quantity of UEs that perform orthogonal code division multiplexing through cyclic shifts is relatively small, reducing uplink resource utilization.

To resolve a problem that a supported quantity of UEs that perform orthogonal code division multiplexing through cyclic shifts is relatively small when a frequency deviation between a center frequency for receiving a signal by UE and a center frequency for transmitting a signal by a base station is greater than a subcarrier spacing used for communication between the base station and the UE, embodiments of the present invention provide a signal transmission method, a signal receiving method, and a device. A basic principle thereof is as follows: A base station determines a target root indicator from a sequence indicator set, and generates a signal sequence based on the target root indicator; and the base station receives an uplink signal, and processes the uplink signal based on the generated signal sequence.

The sequence indicator set is $\{A_1, B_1, A_2, B_2, L, A_s, B_s\}$, $A_i$=i(mod K), $B_i$=−i(mod K), $A_i$ and $B_i$ are root indicators of ZC sequences, i is an integer greater than or equal to 1 and less than or equal to s, s is an integer greater than or equal to 1 and less than or equal to $\lfloor K/2 \rfloor$−1, $\lfloor \ \rfloor$ indicates rounding down, and K is a length of a ZC sequence. The base station generates the signal sequence based on the target root indicator determined from the sequence indicator set, and processes the received uplink signal based on the generated signal sequence. The sequence indicator set is $\{A_1, B_1, A_1, B_2, L, A_s, B_s\}$, s is an integer greater than or equal to 1 and less than or equal to $\lfloor K/2 \rfloor$−1, and the sequence indicator set does not include $\lfloor K/2 \rfloor$ or K−$\lfloor K/2 \rfloor$, or s is a positive integer less than $\lfloor K/2 \rfloor$−1 among integers greater than or equal to 1 and less than or equal to $\lfloor K/2 \rfloor$−1.

This resolves the problem that a supported quantity of UEs that perform orthogonal code division multiplexing through cyclic shifts is relatively small when a frequency deviation between a center frequency for receiving a signal by UE and a center frequency for transmitting a signal by a base station is greater than a subcarrier spacing used for communication between the base station and the UE.

Using the root indicator $\lfloor K/2 \rfloor$ results in the problem that a supported quantity of UEs that perform orthogonal code division multiplexing through cyclic shifts is relatively small when a frequency deviation between a center frequency for receiving a signal by UE and a center frequency for transmitting a signal by a base station is greater than a subcarrier spacing used for communication between the base station and the UE. Specific descriptions are as follows:

It is assumed that a range of a frequency deviation between a center frequency for transmitting a signal by a base station and a center frequency for receiving a signal by each UE in a cell managed by the base station is [−rΔf, rΔf], where Δf is a subcarrier spacing used for communication between the base station and the UE. It is assumed that a target root indicator determined by the base station is q, and a length of a (frequency-domain) signal sequence generated by the base station based on the target root indicator q is N.

In this case, the maximum frequency deviation rΔf results in $$qn\frac{N}{K}$$

time units of cyclic shifts on a time-domain sequence obtained by performing IDFT transform on the (frequency-domain) signal sequence (where each time unit is $$\frac{T}{N}$$

seconds, and T is a time length of the time-domain sequence), and the maximum frequency deviation $-r\Delta f$ results in $$-qn\frac{N}{K}$$

time units of cyclic shifts on a time-domain sequence obtained by performing IDFT transform on the (frequency-domain) signal sequence, where n is $\lfloor r \rfloor$ or $\lfloor r \rfloor+1$.

It is assumed that a range of cyclic shifts, of the time-domain sequence, resulting from a channel delay spread of the UE is $[0,\tau]$. Therefore, when there is the frequency deviation between the center frequency for receiving a signal by the UE and the center frequency for transmitting a signal by the base station, and there is the delay spread, it needs to be ensured that an interval D between cyclic shift values of the different UEs satisfies $$\left(2qn\frac{N}{K}+\tau\right) \le D,$$

to ensure that there is no interference between different UEs that generate uplink signals by using a same target root indicator and that send the generated uplink signals on a same time-frequency resource.

For any two cyclic shift values $l_1$, $l_2$, an interval D between the cyclic shift values is defined as $D=\min\{(l_1-l_2) \bmod N, N-(l_1-l_2) \bmod N\}$, where min $\{x,y\}$ means taking the smaller of x and y. Assuming that K is an even number, and n=1, based on the foregoing inequality, when q is a relatively small positive integer, so that $$2qn\frac{N}{K}$$

is relatively small, for example, $$qn\frac{N}{K} \le \tau,$$

a value of D is relatively small. This is because a cyclic shift value resulting from a frequency deviation may overlap with a cyclic value resulting from a multipath delay. Therefore, a plurality of different cyclic shift values may be used, and an interval between the cyclic shift values is at least D.

Using the root indicator $\lfloor K/2 \rfloor$ or another relatively large root indicator results in relatively large $$qn\frac{N}{K},$$

for example, $$qn\frac{N}{K}$$

greater than $\tau$.

$$\left(qn\frac{N}{K}+\tau'\right) \bmod N$$

resulting from a positive frequency deviation and $$\left(-qn\frac{N}{K}+\tau'\right) \bmod N$$

resulting from a negative frequency deviation are additional cyclic shift values different from the cyclic shift value resulting from the multipath delay, and can only be reserved but cannot be allocated to another user. $0<\tau'<\tau$. $\tau$ is a maximum cyclic shift value resulting from the delay, may be configured by the base station or notified through signaling, and means that a supported quantity of UEs that perform orthogonal code division multiplexing through cyclic shifts is limited, and the cyclic shift values reserved due to the positive and negative frequency deviations cannot be used. This greatly reduces utilization of an uplink time-frequency resource.

In addition, in the prior art, when UE encounters uplink out-of-synchronization, that is, out-of-synchronization with a base station in uplink transmission, the UE needs to send a preamble to the base station, so that the base station determines uplink timing information of the UE based on the preamble, to help the UE perform uplink synchronization. The preamble is a time-domain sequence generated based on a ZC sequence. One preamble may be generated based on one time-domain ZC sequence (having a time-domain root indicator u) and based on a cyclic shift value, or may be generated according to the foregoing method and based on a frequency-domain ZC sequence (having a frequency-domain root indicator P) corresponding to the time-domain ZC sequence. The two methods are equivalent.

In addition, if the root indicator u of the time-domain ZC sequence is known, the corresponding frequency-domain root indicator P is a minimum non-negative integer satisfying $(pu) \bmod K=1$, where K is a length of the time-domain ZC sequence and the corresponding frequency-domain ZC sequence. Without loss of generality, this specification provides descriptions by using an example in which a preamble is generated based on a frequency-domain ZC sequence. The UE may determine the root indicator of the ZC sequence and the cyclic shift value according to a predefined rule or by receiving signaling from the base station, so as to generate the preamble.

Because the UE encounters the uplink out-of-synchronization, a CP of the preamble is relatively long. To resolve a problem of excessively low energy efficiency resulting from an excessively long CP, a subcarrier spacing used by the UE to send the preamble is usually quite small. Therefore, when there is a frequency deviation between a center frequency for sending a signal by the UE and a center frequency for receiving a signal by the base station, the frequency deviation is usually greater than a subcarrier spacing used for communication between the base station and the UE. To make the base station obtain accurate uplink timing information, the root indicator of the ZC sequence needs to ensure that an additional cyclic shift resulting from the frequency deviation and a cyclic shift resulting from a delay spread can be distinguished. Therefore, an LTE system imposes a constraint that a root indicator q of a ZC sequence used to generate a preamble needs to be greater than a value while satisfying 0≤q<K/2.

For example, the root indicator q needs to be greater than a cyclic shift resulting from a maximum delay spread. Therefore, in the prior art, a quantity of root indicators of ZC sequences used to generate preambles is relatively limited. In addition, for each available root indicator of a ZC sequence, the base station needs to allocate different cyclic shift values to different UEs. To ensure that there is no interference between different UEs, both a cyclic shift resulting from a frequency deviation of one UE and a cyclic shift resulting from a delay spread need to be reserved for the UE, and cannot be allocated to another UE. Therefore, a quantity of available cyclic shift values is also relatively limited. To sum up, in the prior art, a quantity of available preamble sequences is relatively limited.

In some scenarios, although UE is in an uplink out-of-synchronization state, only a small amount of information needs to be transmitted, and a base station does not need to obtain uplink timing information. In these scenarios, directly using the prior art results in a very limited quantity of available preambles. For example, due to moving, the UE needs to be handed over to another cell, or handed over to an area covered by another transmitter and receiver point (TRP) in a current cell. In this case, a requirement of the UE is to send a preamble, so that the base station knows a location of the UE in a network. Therefore, uplink timing information is not required. In this case, a root indicator of a ZC sequence used to generate a preamble does not need to ensure that an additional cyclic shift resulting from a frequency deviation and a cyclic shift resulting from a delay spread can be distinguished. Therefore, in these scenarios, directly using the prior art results in a very limited quantity of available preamble sequences.

To resolve a problem that directly using the prior art results in a very limited quantity of available preambles when UE is in an uplink out-of-synchronization state and needs to transmit uplink data but a base station does not need to obtain uplink timing information, embodiments of the present invention provide another signal transmission method and signal receiving method. A basic principle thereof is as follows: UE determines a root indicator q, and the UE generates an uplink signal based on q and a cyclic shift value, where the cyclic shift value is determined by the UE based on a cyclic shift value set, and the cyclic shift value set is as follows:

$$\{(\alpha_0)\bmod N, (\alpha_0 + D)\bmod N, \ldots, (\alpha_0 + (\lfloor \frac{N}{D} \rfloor - 1)D)\bmod N\}$$

where the cyclic shift value set is determined based on q, D is a positive real number, $\alpha_0$ is a real number and is initial cyclic shift information, $\lfloor \ \rfloor$ indicates rounding down, and N is a length of a sequence of the uplink signal.

In the methods in the embodiments of the present invention, there is no value limitation that a root indicator q of a ZC sequence used to generate a preamble needs to be greater than a value. For example, in the prior art, a root indicator of a ZC sequence used to generate a preamble needs to be greater than a maximum delay spread. Therefore, according to the methods in the embodiments of the present invention, a quantity of available root indicators is increased, thereby increasing a quantity of preambles. For example, in the prior art, q=1 cannot be used.

However, in the methods in the embodiments of the present invention, q=1 can be used. Usually, a root indicator q or K−q of a ZC sequence corresponding to a q value that is a relatively small positive integer may be selected. In addition, for a selected root indicator q, a cyclic shift value that can be used by the UE is determined based on the set $$\{(\alpha_0)\bmod N, (\alpha_0 + D)\bmod N, \ldots, (\alpha_0 + (\lfloor \frac{N}{D} \rfloor - 1)D)\bmod N\},$$

where D is a value determined based on q. There are a plurality of methods for determining, by the UE, a cyclic shift value from the set. For example, the UE may select a cyclic shift value from the set according to a predefined rule. For example, the UE selects the cyclic shift value based on an order of all cyclic shift values in the set and according to the predefined rule.

Alternatively, the UE may receive signaling sent by a base station, where the signaling includes a cyclic shift value of the UE. The signaling can include any one of cyclic shift values in the set. Properly determining a value of D based on q can ensure that cyclic shifts of the UE resulting from a frequency deviation and a delay spread can fall within a cyclic shift interval allocated by the base station, without occupying an additional cyclic shift beyond the cyclic shift interval allocated by the base station. This can ensure that there is no inter-user interference. However, in the prior art, selection of a root indicator q needs to meet a value limitation that the root indicator q is greater than a value. In addition, for a root indicator q selected in such a way, only some of elements in the set can be selected as available cyclic shift values, to ensure that there is no inter-user interference. Therefore, according to the methods in the embodiments of the present invention, a quantity of available cyclic shift values is increased, thereby further increasing a quantity of preambles.

The following describes implementations of the embodiments of the present invention in detail with reference to accompanying drawings.

FIG. 1 is a simplified schematic diagram of a system architecture to which an embodiment of the present invention can be applied. As shown in FIG. 1, the system architecture may include a base station 11 and UE 12.

The base station 11 may be a wireless communications base station (BS) or base station controller, or the like. The base station 11 may specifically include a user-plane base station and a control-plane base station. The base station 11 is an apparatus deployed in a radio access network to provide a wireless communication function for the UE 12. Main functions of the base station 11 include: managing a radio resource, compressing an Internet Protocol (IP) header, encrypting a user data flow, selecting a mobility management entity (MME) when user equipment performs attaching, routing user-plane data to a serving gateway (SGW), organizing and sending a paging message, organizing and sending a broadcast message, performing measurement for a purpose of mobility or scheduling, configuring a measurement report, and the like.

The base station 11 may include various forms of macro base stations, micro base stations, relay stations, access points, and the like. In systems that use different wireless access technologies, a device that functions as a base station may have different names. For example, in an LTE system, the device is referred to as an evolved NodeB (eNB or eNodeB); in a 3rd generation mobile communications technology (3G) system, the device is referred to as a NodeB; and in a next-generation wireless communications system, the device is referred to as a gNB. With evolution of communications technologies, the name "base station" may change. In addition, in another possible case, the base station 11 may be another apparatus that provides a wireless communication function for the UE 12. For ease of description, in this embodiment of the present invention, an apparatus that provides a wireless communication function for the UE 12 is referred to as the base station 11.

The UE 12 may be a wireless terminal or a wired terminal. The wireless terminal may be a device that provides voice and/or data connectivity for a user, a handheld device with a wireless connection function, or another processing device connected to a wireless modem. The wireless terminal may communicate with one or more core networks through a radio access network (RAN). The wireless terminal may be a mobile terminal, such as a mobile phone (also referred to as a "cellular" phone) or a computer with a mobile terminal, for example, may be a portable mobile apparatus, a pocket-sized mobile apparatus, a handheld mobile apparatus, a computer built-in mobile apparatus, or an in-vehicle mobile apparatus. Such mobile apparatuses exchange voice and/or data with the radio access network. For example, the wireless terminal may be a device such as a personal communications service (PCS) phone, a cordless phone, a Session Initiation Protocol (SIP) phone, a wireless local loop (WLL) station, or a personal digital assistant (PDA). The wireless terminal may also be referred to as a system, a subscriber unit, a subscriber station, a mobile station, a mobile console, a remote station, an access point (AP), a remote terminal, an access terminal, a user terminal (UT), or a user agent UA). In an embodiment, as shown in FIG. 1, the UE 12 included in the system architecture in the present invention is a mobile phone.

Figure 2:
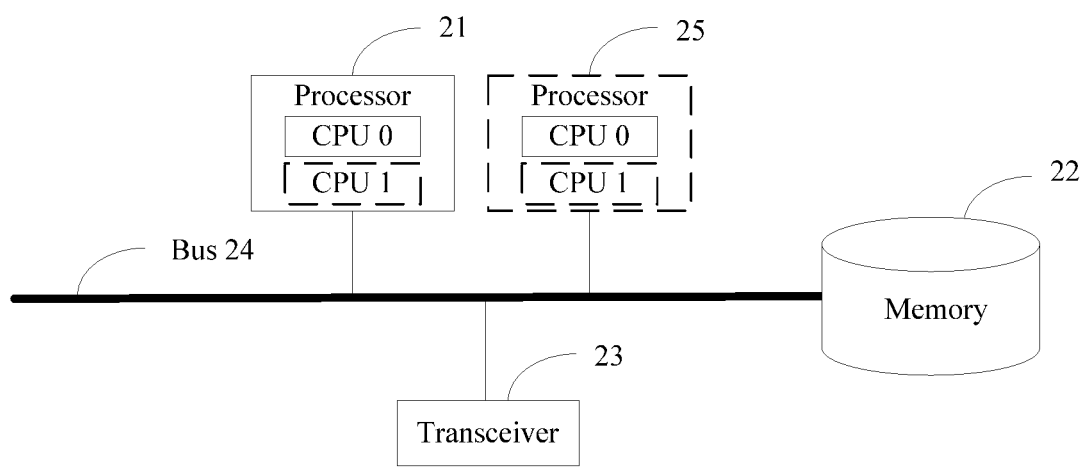
FIG. 2 is a schematic composition diagram of a base station according to an embodiment of the present invention.

FIG. 2 is a schematic composition diagram of a base station according to an embodiment of the present invention. As shown in FIG. 2, the base station may include at least one processor 21, a memory 22, a transceiver 23, and a bus 24.

The following describes the constituent parts of the base station with reference to FIG. 2.

The processor 21 is a control center of the base station, and may be one processor, or may be a collective name of a plurality of processing elements. For example, the processor 21 is a central processing unit (CPU), or may be an application-specific integrated circuit (ASIC), or is configured as one or more integrated circuits for implementing the embodiments of the present invention, for example, one or more microprocessors (DSP), or one or more field programmable gate arrays (FPGA).

The processor 21 may perform various functions of the base station by running or executing a software program stored in the memory 22 and by invoking data stored in the memory 22.

In an embodiment, the processor 21 may include one or more CPUs, for example, a CPU 0 and a CPU 1 shown in FIG. 2.

In an embodiment, the base station may include a plurality of processors, for example, the processor 21 and a processor 25 shown in FIG. 2. Each of the processors may be a single-core (single-CPU) processor, or may be a multi-core (multi-CPU) processor. The processor herein may be one or more devices, circuits, and/or processing cores configured to process data (for example, a computer program instruction).

The memory 22 may be a read-only memory (ROM), another type of static storage device that can store static information and instructions, a random access memory (RAM), or another type of dynamic storage device that can store information and instructions; or may be an electrically erasable programmable read-only memory (EEPROM), a compact disc read-only memory (CD-ROM) or another compact disc storage, an optical disc storage (including a compact optical disc, a laser disc, an optical disc, a digital versatile disc, a Blu-ray disc, and the like), a magnetic disk storage medium or another magnetic storage device, or any other medium that can be used to carry or store expected program code in a form of an instruction or a data structure and that can be accessed by a computer. However, the memory 22 is not limited thereto. The memory 22 may exist independently and be connected to the processor 21 by using the bus 24. Alternatively, the memory 22 may be integrated with the processor 21.

The memory 22 is configured to store a software program for executing the solutions of the present invention, and the processor 21 controls execution of the software program.

The transceiver 23 is configured to communicate with another device or a communications network, for example, an Ethernet network, a radio access network (RAN), or a wireless local area network (WLAN). The transceiver 23 may include all or a part of a baseband processor, and optionally, may further include an RF processor. The RF processor is configured to send or receive an RF signal. The baseband processor is configured to process a baseband signal converted from an RF signal, or a baseband signal to be converted into an RF signal.

The bus 24 may be an industry standard architecture (Industry Standard Architecture, ISA) bus, a peripheral component interconnect (PCI) bus, an extended industry standard architecture (EISA) bus, or the like. The bus may be classified into an address bus, a data bus, a control bus, and the like. For ease of representation, only one bold line is used to represent the bus in FIG. 2, but this does not mean that there is only one bus or only one type of bus.

The device structure shown in FIG. 2 does not constitute a limitation on the base station. The base station may include more or fewer components than those shown in the figure, or some components may be combined, or a different component layout may be used.

Figure 3:
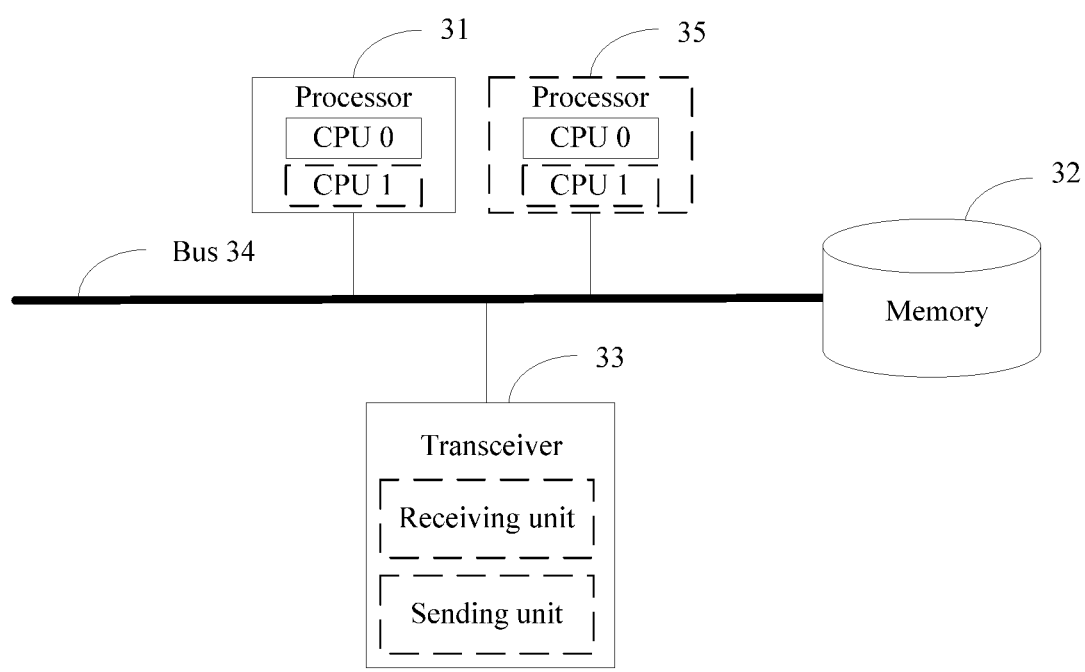
FIG. 3 is a schematic composition diagram of UE according to an embodiment of the present invention.

FIG. 3 is a schematic composition diagram of UE according to an embodiment of the present invention. As shown in FIG. 3, the UE may include at least one processor 31, a memory 32, a transceiver 33, and a bus 34.

The following specifically describes the constituent parts of the UE with reference to FIG. 3.

The processor 31 may be one processor, or may be a collective name of a plurality of processing elements. For example, the processor 31 may be a general purpose CPU, may be an ASIC, or may be one or more integrated circuits configured to control execution of a program of the solutions of the present invention, for example, one or more DSPs or one or more FPGAs. The processor 31 may perform various functions of the UE by running or executing a software program stored in the memory 32 and by invoking data stored in the memory 32.

In an embodiment, the processor 31 may include one or more CPUs. For example, as shown in FIG. 3, the processor 31 includes a CPU 0 and a CPU 1.

In an embodiment, the UE may include a plurality of processors. For example, as shown in FIG. 3, the UE includes the processor 31 and a processor 35. Each of the processors may be a single-CPU, or may be a multi-CPU. The processor herein may be one or more devices, a circuit, and/or a processing core configured to process data (for example, a computer program instruction).

The memory 32 may be a ROM, another type of static storage device that can store static information and instructions, a RAM, or another type of dynamic storage device that can store information and instructions; or may be an EEPROM, a CD-ROM or another compact disc storage, an optical disc storage (including a compact optical disc, a laser disc, an optical disc, a digital versatile disc, a Blu-ray disc, and the like), a magnetic disk storage medium or another magnetic storage device, or any other medium that can be configured to carry or store expected program code in a form of an instruction or a data structure and that can be accessed by a computer. However, the memory 32 is not limited thereto. The memory 32 may exist independently and be connected to the processor 31 by using the bus 34. Alternatively, the memory 32 may be integrated with the processor 31.

The transceiver 33 is configured to communicate with another device or a communications network, for example, Ethernet, a RAN, or a WLAN. The transceiver 33 may include a receiving unit to implement a receiving function, and a sending unit to implement a sending function.

The bus 34 may be an ISA bus, a PCI bus, an EISA bus, or the like. The bus may be classified into an address bus, a data bus, a control bus, and the like. For ease of representation, only one bold line is used to represent the bus in FIG. 3, but this does not mean that there is only one bus or only one type of bus.

The device structure shown in FIG. 3 does not constitute a limitation on the UE. The UE may include more or fewer components than those shown in the figure, or some components may be combined, or a different component layout may be used. Although not shown, the UE may further include a battery, a camera, a Bluetooth module, a GPS module, a display screen, and the like. Details are not described herein.

Figure 4:
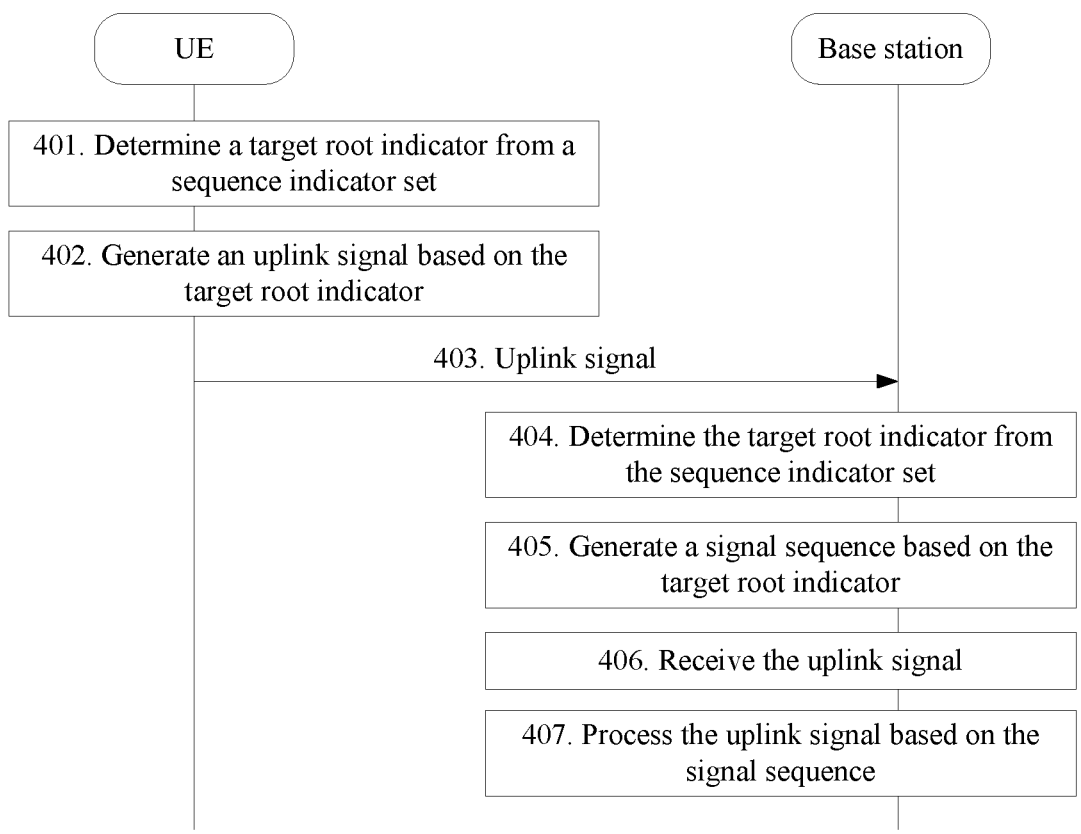
FIG. 4 is a flowchart of a signal transmission method according to an embodiment of the present invention.

FIG. 4 is a flowchart of a signal transmission method according to an embodiment of the present invention. As shown in FIG. 4, the method may include the following operations.

In operation 401, UE determines a target root indicator from a sequence indicator set.

The sequence indicator set may be $\{A_1, B_1, A_2, B_2, L, A_s, B_s\}$, or the sequence indicator set may be a subset of $\{A_1, B_1, A_2, B_2, L, A_s, B_s\}$. Specifically, $A_i$ and $B_i$ appear in pairs in the subset. For example, the sequence indicator set is $\{A_1, B_1, A_2, B_2\}$, or the sequence indicator set is where $\{A_1, B_1, A_4, B_4, A_s, B_s\}$, where $A_i=i(\mod K)$, $B_i=-i(\mod K)$, $A_i$ and $B_i$ are root indicators of ZC sequences, i is an integer greater than or equal to 1 and less than or equal to s, s is an integer greater than or equal to 1 and less than or equal to $\lfloor K/2 \rfloor-1$, $\lfloor \ \rfloor$ indicates rounding down, and K is a length of a ZC sequence. For example, that K is a length of a ZC sequence means that a quantity of elements included in the ZC sequence is K. For example, the ZC sequence is z(n) (n=0, ..., K−1), and the quantity of elements included in the ZC sequence is K; therefore, the length of the ZC sequence is K.

It should be note that in one embodiment of the present invention, $A_i=i(\mod K)$ means that $A_i$ and i have a same meaning under mod K, that is, $A_i \mod K=i \mod K$. Likewise, $B_i=-i(\mod K)$ means that $B_i$ and −i have a same meaning under mod K, that is, $B_i \mod K=-i \mod K$. In addition, in this embodiment of the present invention, an uplink signal may be a signal of an uplink control channel, or may be an uplink reference signal. The uplink reference signal may include at least one of the following: an uplink DMRS and an uplink SRS.

For example, in one embodiment of the present invention, a specific process of determining, by the UE, the target root indicator may be as follows:

First, the UE determines the sequence indicator set.

The parameter s used to determine the sequence indicator set may be predefined; or the UE may receive first signaling sent by a base station, where the first signaling includes the parameter s. The base station may explicitly or implicitly notify the UE of s through the first signaling. The explicitly notifying the UE of s means that a value of s is directly included in the first signaling. The implicitly notifying the UE of s means that a parameter related to s is included in the first signaling, where the parameter is used to determine a value of s.

Next, when the UE needs to send the uplink signal to the base station, the UE may determine the target root indicator from the sequence indicator set.

The UE may determine the target root indicator from the sequence indicator set according to a predefined rule. In addition, when i is relatively small, a PAPR of a time-domain sequence obtained by performing IDFT processing on a sequence generated based on a ZC sequence whose root indicator is $A_i$ or $B_i$ is also relatively small. Therefore, the UE may preferentially select $A_i$ or $B_i$ whose i value is smaller as the target root indicator, so that a PAPR of a signal sent in time domain is relatively small. This helps improve transmitter efficiency of the UE.

In operation 402, the UE generates an uplink signal based on the target root indicator.

In one embodiment of the present invention, a sequence of the uplink signal is a sequence generated based on a target ZC sequence. A root indicator of the target ZC sequence is the target root indicator.

For example, in one embodiment of the present invention, a specific process of generating, by the UE, the uplink signal based on the target root indicator may be as follows:

First, the UE generates the target ZC sequence based on the target root indicator determined in operation 401. It is assumed that $A_q$ or $B_q$ is the target root indicator determined by the UE from the sequence indicator set. For convenience, it is assumed that $A_q \mod K=q'$ or $B_q \mod K=q'$.

The UE may generate the frequency-domain target ZC sequence based on the determined target root indicator and the following formula:

when K is an odd number, $$Z_{q'}(n) = \exp\left(-j2\pi q' \frac{n(n+1)/2}{K}\right),$$

where n=0, ..., K−1; or
when K is an even number, $$Z_{q'}(n) = \exp\left(-j2\pi q' \frac{n^2/2}{K}\right),$$

where n=0, ..., K−1.

$Z_q(n)$ indicates the generated frequency-domain target ZC sequence, and K indicates a length of the ZC sequence.

Next, the UE generates a sequence $\overline{Z}_q(n)$, $(n=0, \ldots, N-1)$ with a length of N based on the target ZC sequence $Z_q(n)$, $(n=0, \ldots, K-1)$ with a length of K.

The sequence $\overline{Z}_q(n)$ with the length of N may be the target ZC sequence itself, or may be a sequence obtained by truncating or cyclically extending the target ZC sequence. Therefore, a relationship between N and K may be N=K, or N<K, or N>K. For example, if N>K, a sequence whose length is N and that is generated by cyclically extending the target ZC sequence is $\overline{Z}_q(n)=Z_q(n \bmod K)$, $=0, \ldots, N-1)$.

Finally, the UE generates the sequence whose length is N and that is of the uplink signal, based on a cyclic shift value α and the sequence $\overline{Z}_q(n)$, $(n=0, \ldots, N-1)$ with the length of N.

In one embodiment, the UE performs IDFT transform on the sequence $\overline{Z}_q(n)$ to obtain a corresponding time-domain sequence, and performs a units of cyclic shifts on the time-domain sequence, to obtain a time-domain sequence obtained by performing IDFT transform on the sequence of the uplink signal.

In another embodiment, the UE directly obtains the sequence of the uplink signal based on the cyclic shift value and a formula $e^{j\alpha n}\overline{Z}_q(n)$.

In an embodiment, the cyclic shift value α may be a predefined fixed value, or a value determined from a plurality of values according to a predefined method.

Alternatively, the UE may directly generate the sequence of the uplink signal based on the target root indicator and the cyclic shift value, without generating an intermediate parameter: the target ZC sequence.

Figure 5:
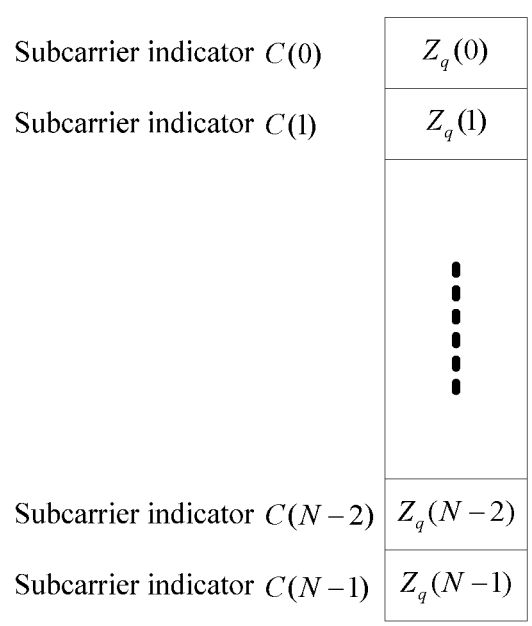
FIG. 5 is a schematic diagram of sequence mapping according to an embodiment of the present invention.

After obtaining the sequence of the uplink signal, as shown in FIG. 5, the UE may map, in an order of subcarrier indicators, the sequence whose length is N and that is of the uplink signal to N uniformly spaced subcarriers. In one embodiment of the present invention, the UE may map the generated sequence whose length is N to the N uniformly spaced subcarriers in descending order of the subcarrier indicators or in ascending order of the subcarrier indicators. This is not specifically limited herein in this embodiment of the present invention. FIG. 5 shows an example in which the generated sequence whose length of N is mapped to the N uniformly spaced subcarriers in ascending order of the subcarrier indicators.

Further, in one embodiment, before the UE generates the uplink signal, the UE may receive second signaling that includes the cyclic shift value and that is sent by the base station, and generate the sequence of the uplink signal based on the cyclic shift value and the target root indicator, so as to generate the uplink signal. The base station may explicitly or implicitly notify the UE of the cyclic shift value through the second signaling. The explicitly notifying the UE of the cyclic shift value means that a value of the cyclic shift value is directly included in the second signaling. The implicitly notifying the UE of the cyclic shift value means that a parameter related to the cyclic shift value is included in the second signaling, where the parameter is used to determine a value of the cyclic shift value.

In another one embodiment, before the UE generates the uplink signal, the UE may receive third signaling that includes information about the cyclic shift value and that is sent by the base station, so as to generate the uplink signal based on the information about the cyclic shift value and the target root indicator. To be specific, the UE may first determine the cyclic shift value based on the received information about the cyclic shift value, and then generate the uplink signal based on the determined cyclic shift value and the target root indicator.

The third signaling may include indication information of the cyclic shift value. For example, the total cyclic shift value is divided into X portions, and the third signaling includes using an $a^{th}$ portion, where a is an integer greater than or equal to 1 and less than or equal to X. A value of a may be determined by the base station based on the cyclic shift value. The base station determines the cyclic shift value based on a cyclic shift value set, where an interval between any two cyclic shift values in the cyclic shift value set is greater than or equal to D. D is a positive real number satisfying $$\left(2qn\frac{N}{K} + \tau\right) \le D,$$

τ is a positive real number, n is a positive integer, q is a positive integer less than or equal to s, $A_q$ or $B_q$ is the target root indicator, and N is the length of the sequence of the uplink signal. For example, the base station may determine, based on the selected cyclic shift value α and D, that a value of a is $a=\lfloor(\alpha-\alpha_0)/D\rfloor+1$, where $\alpha_0$ is an initial cyclic shift value.

The UE may determine, based on D and the third signaling that includes using the $a^{th}$ portion, the cyclic shift value selected by the base station. For example, the UE may determine, based on a and D, that the cyclic shift value is $\alpha=\alpha_0+(a-1)D$. $\alpha_0$ may be a value determined according to a predefined method, or may be indicated by the base station to the UE through the third signaling or other signaling. By using $\alpha=\alpha_0+(a-1)D$ or $a=\lfloor(\alpha-\alpha_0)/D\rfloor+1$, the base station or the UE may determine a based on α, or determine α based on a.

In one embodiment of the present invention, D is a predefined value.

In one embodiment of the present invention, the UE may receive sixth signaling sent by the base station, where the sixth signaling includes D. Correspondingly, the UE may determine the cyclic shift value based on using the $a^{th}$ portion included in the third signaling and D included in the sixth signaling. The base station may explicitly or implicitly notify the UE of D through the sixth signaling. The explicitly notifying the UE of D means that a value of D is directly included in the sixth signaling. The implicitly notifying the UE of D means that a parameter related to D is included in the sixth signaling, where the parameter is used to determine a value of D.

In one embodiment of the present invention, the UE may receive fourth signaling sent by the base station, where the fourth signaling includes τ used to determine D. Correspondingly, the UE may determine D based on τ, q, and n, and then determine the cyclic shift value based on the determined D and using the $a^{th}$ portion included in the third signaling. τ may also be predefined. The base station may explicitly or implicitly notify the UE of τ through the fourth signaling. The explicitly notifying the UE of τ means that a value of τ is directly included in the fourth signaling. The implicitly notifying the UE of τ means that a parameter related to τ is included in the fourth signaling, where the parameter is used to determine a value of τ.

In one embodiment of the present invention, the UE may receive fifth signaling sent by the base station, where the fifth signaling includes n used to determine D. Correspondingly, the UE may determine D based on τ, q, and n, and then determine the cyclic shift value based on the determined D and using the $a^{th}$ portion included in the third signaling. n may also be predefined. The base station may explicitly or implicitly notify the UE of n through the fifth signaling. The explicitly notifying the UE of n means that a value of n is directly included in the first signaling. The implicitly notifying the UE of n means that a parameter related to n is included in the first signaling, where the parameter is used to determine a value of n.

It should be noted that in one embodiment of the present invention, the third signaling, the fourth signaling, the fifth signaling, and the sixth signaling may be same signaling.

In operation 403, the UE sends the uplink signal.

In operation 404, a base station determines the target root indicator from the sequence indicator set.

For example, in this embodiment of the present invention, a specific process of determining, by the base station, the target root indicator may be as follows:

First, the base station determines the sequence indicator set.

The sequence indicator set may be $\{A_1, B_1, A_2, B_2, L, A_s, B_s\}$, or the sequence indicator set may be a subset of $\{A_1, B_1, A_2, B_2, L, A_s, B_s\}$. Specifically, $A_i$ and $B_i$ appear in pairs in the subset. For example, the sequence indicator set is $\{A_1, B_1, A_2, B_2\}$, or the sequence indicator set is $\{A_1, B_1, A_4, B_4, A_s, B_s\}$, where $A_i$=i(mod K), $B_i$=−i(mod K), $A_i$ and $B_i$ are root indicators of ZC sequences, i is an integer greater than or equal to 1 and less than or equal to s, s is an integer greater than or equal to 1 and less than or equal to $\lfloor K/2 \rfloor-1$, $\lfloor \; \rfloor$ indicates rounding down, and K is a length of a ZC sequence.

The parameters used to determine the sequence indicator set may be predefined, or may be determined by the base station. In addition, when s is not predefined, the base station needs to send the first signaling to the UE, to indicate s to the UE.

For example, a process of determining s by the base station may be: obtaining, by the base station, a maximum frequency deviation and a maximum delay spread, and determining s based on the maximum frequency deviation and the maximum delay spread.

The maximum frequency deviation is a maximum frequency deviation between a center frequency for transmitting a signal by the base station and a center frequency for receiving a signal by each UE in a cell managed by the base station. The maximum frequency deviation may be predefined, or may be obtained by the base station through estimation, or may be determined by the base station based on a subcarrier spacing used for an uplink DMRS or an uplink SRS sent by the UE. For example, if the subcarrier spacing is relatively large, a system has relatively low sensitivity to a frequency deviation of the UE, and therefore an allowable maximum frequency deviation is relatively large. Therefore, the maximum frequency deviation may be determined based on the subcarrier spacing used for the uplink DMRS or the uplink SRS sent by the UE.

The maximum delay spread is a maximum value of a cyclic shift value resulting from a delay spread caused by multipath. The maximum value of the cyclic shift value resulting from the delay spread may be obtained by the base station through estimation, may be predefined, or may be determined by the base station based on information such as a radius of a cell served by the base station.

The base station may determine s based on an inequality $$\left(2qn\frac{N}{K} + \tau\right) \le D,$$

where s is a maximum value of q satisfying the inequality, q is an integer greater than or equal to 0 and less than or equal to K/2, n is $\lfloor r \rfloor$ or $\lfloor r \rfloor+1$, r is equal to a ratio of the maximum frequency deviation to the subcarrier spacing $\Delta f$ used for communication between the base station and the UE, N is a preset length of a signal sequence, K is a length of a ZC sequence, N≥K, τ is the maximum delay spread, and D is an interval between cyclic shift values when different UEs use a ZC sequence with a same root indicator.

It is assumed that a range of a frequency deviation between the center frequency for transmitting a signal by the base station and the center frequency for receiving a signal by each UE in the cell managed by the base station is [−r$\Delta f$, r$\Delta f$], the target root indicator determined by the base station is q, and q is an integer greater than or equal to 0 and less than or equal to K/2. In this case, the maximum frequency deviation r$\Delta f$ results in $$qn\frac{N}{K}$$

time units of cyclic shifts on a time-domain sequence obtained through IDFT transform, and the maximum frequency deviation −r$\Delta f$ results in $$-qn\frac{N}{K}$$

time units of cyclic shifts on a time-domain sequence obtained through IDFT transform. It is assumed that a range of the cyclic shift value resulting from the delay spread is [0,τ]. If it needs to be ensured that there is no interference between different UEs when there is a frequency deviation between a center frequency for receiving a signal by UE and the center frequency for transmitting a signal by the base station, and there is a delay spread, $$\left(2qn\frac{N}{K} + \tau\right) \le D$$

needs to be ensured. In this way, all q satisfying the inequality can be obtained by solving the inequality, so as to obtain s, thereby ensuring that even if a frequency deviation is greater than a subcarrier spacing used for communication between the base station and UE, a root indicator, allocated to the UE, of a ZC sequence can ensure that cyclic shifts resulting from the frequency deviation and a delay spread can fall within a cyclic shift interval allocated by the base station, without occupying an additional cyclic shift beyond the cyclic shift interval allocated by the base station.

There are multiple methods for determining s by the base station. For example, if the base station has determined the interval D according to some criteria, the base station may obtain s by solving the foregoing inequality. For example, when n=1, N=K, D=N/4, and τ=N/12, q≤$\lfloor N/12 \rfloor$ may be obtained by solving the foregoing inequality. Assuming that N=24, s=2 may be obtained. Therefore, the sequence indicator set determined by the base station is {1, K−1, 2, K−2} or a subset of {1, K−1, 2, K−2}. Any sequence indicator x may be replaced with another indicator y, provided that y satisfies x=y(mod K). For another example, the base station may jointly determines and the interval D based on a plurality of currently available root indicators, so that s and D satisfy an inequality $$\left(2sn\frac{N}{K}+\tau\right)\le D.$$

By determining s, the base station can determine the sequence indicator set.

Next, the base station determines the target root indicator from the sequence indicator set.

In operation 405, the base station generates a signal sequence based on the target root indicator.

In one embodiment of the present invention, the signal sequence is a sequence generated based on a target ZC sequence. A root indicator of the target ZC sequence is the target root indicator.

For example, in one embodiment of the present invention, a specific process of generating, by the base station, the information sequence based on the target root indicator may be as follows:

First, the base station generates the target ZC sequence based on the target root indicator.

It should be noted that a specific implementation process of generating the target ZC sequence based on the target root indicator in operation 405 is similar to the specific implementation process of generating the target ZC sequence based on the target root indicator in operation 402 in this embodiment of the present invention. Details are not described herein again in this embodiment of the present invention.

Then, the base station uses the target ZC sequence as a sequence generated based on the ZC sequence, or truncates or cyclically extends the target ZC sequence to obtain a sequence generated based on the target ZC sequence. Further, the base station obtains the signal sequence based on the cyclic shift value and the sequence that is generated based on the target ZC sequence. A specific implementation process of obtaining, by the base station, the signal sequence based on the cyclic shift value and the sequence that is generated based on the target ZC sequence is similar to the specific implementation process in operation 402 in this embodiment of the present invention. Details are not described herein again in this embodiment of the present invention.

Alternatively, the base station directly generates the signal sequence based on a target root sequence and the cyclic shift value, without generating an intermediate variable: the target ZC sequence.

Further, to enable different UEs to use a same time-frequency-domain resource without generating interference, in a possible implementation, the base station may send the second signaling to the UE, where the second signaling includes the cyclic shift value, and the cyclic shift value is correlated with the UE, so that the UE can generate the uplink signal based on the cyclic shift value and the determined target root indicator.

In another embodiment, the base station may send the third signaling to the UE, where the third signaling includes the information about the cyclic shift value, and the information about the cyclic shift value is correlated with the UE, so that the UE can generate the uplink signal based on the information about the cyclic shift value and the determined target root indicator. The cyclic shift value is determined based on the cyclic shift value set. An interval between any two cyclic shift values in the cyclic shift value set is greater than or equal to D. D is a positive real number satisfying $$\left(2qn\frac{N}{K}+\tau\right)\le D.$$

D is predefined; or the base station may notify the UE of D through the sixth signaling; or the base station may send the fourth signaling to the UE, where the fourth signaling include sτ used to determine D; or the base station may send the fifth signaling to the UE, where the fifth signaling includes n used to determine D.

When the base station indicates n through the fifth signaling, before the base station notifies the UE of n through the fifth signaling, the base station may determine n based on a frequency deviation. When the base station indicates τ through the fourth signaling, before the base station notifies the UE of τ through the fifth signaling, the base station may determine τ based on a delay spread. τ may also be predefined. n may also be predefined. A method for determining the information about the cyclic shift value included in the third signaling is similar to the specific implementation process in step 402 in this embodiment of the present invention. Details are not described herein again in this embodiment of the present invention.

In operation 406, the base station receives the uplink signal.

In operation 407, the base station processes the uplink signal based on the signal sequence.

After receiving the uplink signal from the UE, the base station may process the uplink signal based on the generated signal sequence. For example, the base station may process the uplink signal based on the signal sequence to obtain a channel estimation result or to perform signal detection. For example, the base station may perform correlation on the uplink signal based on the signal sequence. For example, the performing, by the base station, correlation on the uplink signal based on the signal sequence is as follows: Assuming that x(n) indicates the generated signal sequence, and y(n) indicates the uplink signal received by the base station, where n=0, . . . , N−1, for example, signals received on N subcarriers, the base station may perform the following processing on the uplink signal:

$$\frac{1}{N}\sum_{n=0}^{N-1}x(n)^*y(n)$$

where x(n)* indicates a conjugate of x(n).

It should be noted that in this embodiment of the present invention, the first signaling, the second signaling, the third signaling, the fourth signaling, the fifth signaling, and the sixth signaling may be higher layer signaling, for example, radio resource control (RRC) signaling, multiple access control signaling (MAC CE), or downlink control signaling carrying downlink control information (DCI).

According to one embodiment of the present invention, the base station generates the signal sequence based on the target root indicator determined from the sequence indicator set, and processes the received uplink signal based on the generated signal sequence. The sequence indicator set is $\{A_1, B_1, A_2, B_2, L, A_s, B_s\}$, is an integer greater than or equal to 1 and less than or equal to $\lfloor K/2 \rfloor-1$, and the sequence indicator set does not include a root indicator $\lfloor K/2 \rfloor$ or $K-\lfloor K/2 \rfloor$, or s is a positive integer less than $\lfloor K/2 \rfloor -1$ among integers greater than or equal to 1 and less than or equal to $\lfloor K/2 \rfloor -1$. This resolves a problem that a supported quantity of UEs that perform orthogonal code division multiplexing through cyclic shifts is relatively small when a frequency deviation between a center frequency for receiving a signal by UE and a center frequency for transmitting a signal by a base station is greater than a subcarrier spacing used for communication between the base station and the UE.

Further, in one embodiment of the present invention, a relationship between a root indicator and the interval D is constrained by using the inequality $$\left(2qn\frac{N}{K}+\tau\right) \leq D.$$

Jointly determining s (an upper limit of q satisfying the foregoing inequality) and the interval D based on the foregoing inequality can ensure that a total cyclic shift of the UE resulting from the frequency deviation and the delay spread can fall within the interval D, without occupying an additional cyclic shift beyond the cyclic shift interval. This can ensure that there is no interference between different UEs.

In addition, a value of s may be further limited, for example, to a relatively small value such as 1, 2, or 3. In this case, using any root indicator in the set $\{A_1, B_1, A_2, B_2, L, A_s, B_s\}$ can make the interval D satisfying the foregoing inequality be relatively small. When a total quantity of available cyclic shift values is fixed, relatively small D indicates a relatively large quality of cyclic shift values that can be allocated to different UEs. Therefore, a larger quantity of UEs that perform orthogonal code division multiplexing through cyclic shifts is supported in this embodiment of the present invention. If a root indicator corresponding to relatively small q cannot be allocated currently, according to this embodiment of the present invention, the base station may preferentially allocate another relatively small q value. In this case, D satisfying the foregoing inequality is relatively small. Therefore, compared with using the root indicator $\lfloor K/2 \rfloor$ or $K-\lfloor K/2 \rfloor$, according to this method in the present invention, a quantity of UEs that perform orthogonal code division multiplexing through cyclic shifts can still be increased.

Figure 6:
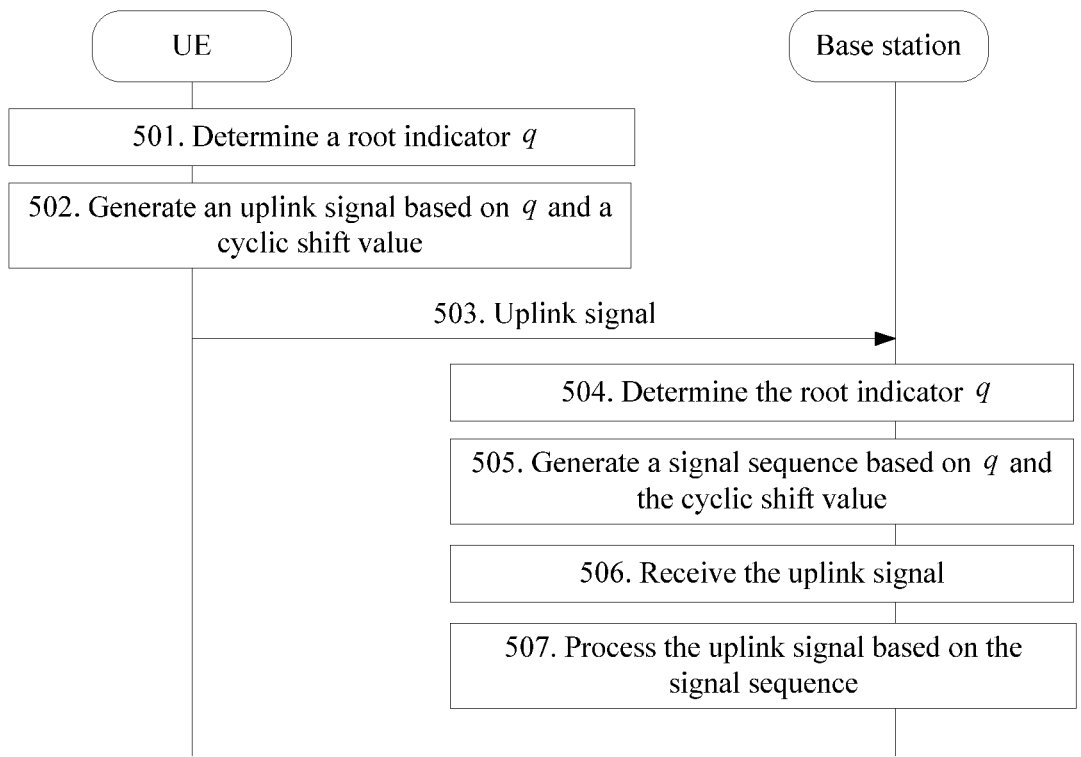
FIG. 6 is a flowchart of another signal transmission method according to an embodiment of the present invention.

FIG. 6 is a flowchart of another signal transmission method according to an embodiment of the present invention. As shown in FIG. 6, the method may include the following operations.

In operation 501, UE determines a root indicator q.

The root indicator q is a frequency-domain root indicator. That is, a root indicator p of a ZC sequence generated by performing IDFT transform on a ZC sequence whose root indicator is q is a minimum non-negative integer satisfying pq=1(mod K) where K is a length of the ZC sequence. In one embodiment of the present invention, the method is described based on the frequency-domain root indicator q. However, optionally, the method may be alternatively described based on the corresponding time-domain root indicator p.

In operation 502, the UE generates an uplink signal based on q and a cyclic shift value.

The cyclic shift value is determined by the UE based on a cyclic shift value set. The cyclic shift value set is $$\left\{(\alpha_0) \bmod N, (\alpha_0 + D) \bmod N, \ldots, \left(\alpha_0 + \left(\left\lfloor \frac{N}{D} \right\rfloor - 1\right)D\right) \bmod N\right\}.$$

The cyclic shift value set is determined based on q, D is a positive real number, $\alpha_0$ is a real number and is initial cyclic shift information, $\lfloor \ \rfloor$ indicates rounding down, and N is a length of a sequence of the uplink signal. q belongs to a set $\{A_1, B_1, A_2, B_2\}$, where $A_i$=i(mod K), $B_i$=-i(mod K) and i is 1 or 2. Certainly, q may alternatively belong to a set $\{A_1, B_1, A_2, B_2, L, A_s, B_s\}$ or a subset of $\{A_1, B_1, A_2, B_2, L, A_s, B_s\}$. $A_i$ and $B_i$ appear in pairs in the subset. $A_i$=i(mod K), $B_i$=-i(mod K), $A_i$ and $B_i$ are root indicators of ZC sequences, i is an integer greater than or equal to 1 and less than or equal to s, s is an integer greater than or equal to 1 and less than or equal to $\lfloor K/2 \rfloor -1$, and $\lfloor \ \rfloor$ indicates rounding down.

There are multiple methods for determining, by the UE, a cyclic shift value from the cyclic shift value set. For example, the UE may select a cyclic shift value from the set according to a predefined rule. For example, the UE selects the cyclic shift value based on an order of all cyclic shift values in the set and according to the predefined rule. Alternatively, the UE may receive signaling sent by a base station, where the signaling includes a cyclic shift value of the UE. The signaling can include any one of cyclic shift values in the set.

Further, in this embodiment of the present invention, before the UE generates the uplink signal based on q and the cyclic shift value, the UE may first determine the cyclic shift value set in the following manners:

Manner 1: The UE may receive first signaling sent by the base station, where the first signaling includes D corresponding to q. Correspondingly, the UE may determine the cyclic shift value set based on D. In addition, in this embodiment of the present invention, there are at least two different q, corresponding to different D. In an implementation method, the first signaling may notify D respectively corresponding to a plurality of q. For example, the first signaling may notify $(q_1, D_1), (q_2, D_2)(q_3, D_3)$. The UE determines, according to a predefined rule, a root indicator $q \in \{q_1, q_2, q_3\}$ currently used for sending an uplink signal, so as to know a currently used interval D. Alternatively, a possible value of D corresponding to each root indicator q is one or more predefined values. For example, the possible value may be predefined by using a table. In this case, the first signaling may include one of a plurality of possible values of D corresponding to one q.

For example, the first signaling may be RRC signaling, a MAC CE, or downlink control signaling carrying DCI.

Manner 2: The UE may receive second signaling sent by the base station, where the second signaling includes $\tau$ and $\tau$ is a parameter related to a maximum delay spread. For example, $\tau$ is a cyclic shift value resulting from the maximum delay spread. Correspondingly, the UE may determine the cyclic shift value set based on q and $\tau$.

When $0 \leq q \bmod K < K/2$, D used to determine the cyclic shift value set is a positive real number satisfying $$\left(2(q \bmod K)n\frac{N}{K}+\tau\right) \leq D.$$

When $K/2 \leq q \bmod K < K$, D used to determine the cyclic shift value set is a positive real number satisfying $$\left(2((K-(q \bmod K)))n\frac{N}{K}+\tau\right) \leq D,$$

where n is a positive integer, and K is a length of a ZC sequence. In an implementation, n is predefined. In another implementation, the base station may notify the UE of n through signaling.

For example, the second signaling may be RRC signaling, a MAC CE, or downlink control signaling carrying DCI.

Manner 3: The UE may receive third signaling sent by the base station, where the third signaling includes a cyclic shift value set $$\left\{(\alpha_0)\bmod N, (\alpha_0+D)\bmod N, \ldots, \left(\alpha_0+\left(\left\lfloor\frac{N}{D}\right\rfloor-1\right)D\right)\bmod N\right\}$$

corresponding to q. For example, the third signaling may be RRC signaling, a MAC CE, or downlink control signaling carrying DCI.

In addition, in one embodiment of the present invention, the initial cyclic shift information is required for determining the cyclic shift value set. The initial cyclic shift information may be predefined; or the UE may receive fourth signaling sent by the base station, where the fourth signaling includes the initial cyclic shift information. For example, the fourth signaling may be RRC signaling, a MAC CE, or downlink control signaling carrying DCI.

In operation 503, the UE sends the uplink signal.

In operation 504, a base station determines the root indicator q.

In operation 505, the base station generates a signal sequence based on q and the cyclic shift value.

In addition, the base station may send, to the UE in the following manners, a parameter used to determine the cyclic shift value set:

Manner 1: The base station sends the first signaling to the UE, where the first signaling includes D corresponding to q. Different q is corresponding to different D.

Manner 2: The base station sends the second signaling to the UE, where the second signaling includes τ.

There may be multiple methods for determining τ by the base station. For example, τ may be predefined, or may be obtained by the base station through estimation, or may be obtained by the base station based on information such as a radius of a cell served by the base station.

Manner 3: The base station sends the third signaling to the UE, where the third signaling includes the cyclic shift value set $$\left\{(\alpha_0)\bmod N, (\alpha_0+D)\bmod N, \ldots, \left(\alpha_0+\left(\left\lfloor\frac{N}{D}\right\rfloor-1\right)D\right)\bmod N\right\}$$

corresponding to q.

In addition, in one embodiment of the present invention, the initial cyclic shift information is required for determining the cyclic shift value set. The initial cyclic shift information may be predefined; or the base station sends the fourth signaling to the UE, where the fourth signaling includes the initial cyclic shift information.

In operation 506, the base station receives the uplink signal.

In operation 507, the base station processes the uplink signal based on the signal sequence.

It should be noted that specific descriptions of operation 501 to operation 507 in this embodiment of the present invention are similar to specific descriptions of corresponding content in operation 401 to operation 407 in another embodiment of the present invention. For the specific descriptions of operation 501 to operation 507 in this embodiment of the present invention, refer to the specific descriptions of the corresponding content in operation 401 to operation 407 in the another embodiment. Details are not described herein again in this embodiment of the present invention.

In one embodiment of the present invention, there is no value limitation that a root indicator q of a ZC sequence used to generate a preamble needs to be greater than a value. For example, in the prior art, a root indicator of a ZC sequence used to generate a preamble needs to be greater than a maximum delay spread. Therefore, according to the method in this embodiment of the present invention, a quantity of available root indicators is increased, thereby increasing a quantity of preambles. For example, in the prior art, when it is considered that there is a frequency deviation between a base station and UE, q=1 cannot be used. However, in the method in this embodiment of the present invention, even if there is a frequency deviation between the base station and the UE, q=1 can be used. Usually, a root indicator q or K−q of a ZC sequence corresponding to a q value that is a relatively small positive integer may be selected. In addition, for a selected root indicator q, a cyclic shift value that can be used by the UE and a cyclic shift value that can be allocated by the base station are determined based on the set $$\left\{(\alpha_0)\bmod N, (\alpha_0+D)\bmod N, \ldots, \left(\alpha_0+\left(\left\lfloor\frac{N}{D}\right\rfloor-1\right)D\right)\bmod N\right\},$$

where D is a value determined based on q.

Properly determining a value of D based on q can ensure that cyclic shifts of the UE resulting from a frequency deviation and a delay spread can fall within a cyclic shift interval allocated by the base station, without occupying an additional cyclic shift beyond the cyclic shift interval allocated by the base station. This can ensure that there is no inter-user interference. However, in the prior art, selection of a root indicator q needs to meet a value limitation that the root indicator q is greater than a value. In addition, for a root indicator q selected in such a way, only some of elements in the set can be selected as available cyclic shift values, to ensure that there is no inter-user interference. Therefore, according to the method in this embodiment of the present invention, a quantity of available cyclic shift values is increased, thereby further increasing a quantity of preamble sequences.

Further, in one embodiment of the present invention, for a selected root indicator q, a cyclic shift value that can be used by the UE and a cyclic shift value that can be allocated by the base station are all elements in the set $$\left\{(\alpha_0)\bmod N, (\alpha_0+D)\bmod N, \ldots, \left(\alpha_0+\left(\left\lfloor\frac{N}{D}\right\rfloor-1\right)D\right)\bmod N\right\}.$$

This means that a supported quantity of UEs that perform orthogonal code division multiplexing through cyclic shifts is larger on a same time-frequency resource, thereby improving utilization of an uplink time-frequency resource.

The foregoing describes the solutions provided in the embodiments of the present invention mainly from a perspective of interaction between network elements. It may be understood that, to implement the foregoing functions, the network elements such as the base station and the UE include corresponding hardware structures and/or software modules for performing the functions. A person of ordinary skill in the art should be easily aware that, with reference to the algorithm steps of the examples described in the embodiments disclosed in this specification, the present invention can be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the present invention.

In the embodiments of the present invention, functional modules of the base station and the UE may be divided based on the foregoing method examples. For example, the functional modules may be divided based on the corresponding functions, or two or more functions may be integrated in one processing module. The integrated module may be implemented in a form of hardware, or may be implemented in a form of a software functional module. It should be noted that the module division in the embodiments of the present invention is an example, and is merely logical function division. During actual implementation, there may be another division manner.

Figure 7:
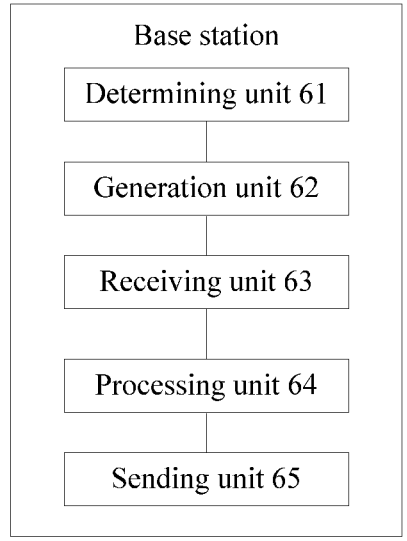
FIG. 7 is a schematic composition diagram of another base station according to an embodiment of the present invention.

When the functional modules are divided based on the corresponding functions, FIG. 7 is a possible schematic composition diagram of the base station in the foregoing embodiments. As shown in FIG. 7, the base station may include: a determining unit 61, a generation unit 62, a receiving unit 63, and a processing unit 64.

The determining unit 61 is configured to support the base station in performing step 404 in the signal transmission method shown in FIG. 4, and operation 504 in the signal transmission method shown in FIG. 6.

The generation unit 62 is configured to support the base station in performing step 405 in the signal transmission method shown in FIG. 4, and operation 505 in the signal transmission method shown in FIG. 6.

The receiving unit 63 is configured to support the base station in performing step 406 in the signal transmission method shown in FIG. 4, and operation 506 in the signal transmission method shown in FIG. 6.

The processing unit 64 is configured to support the base station in performing step 407 in the signal transmission method shown in FIG. 4, and operation 507 in the signal transmission method shown in FIG. 6.

In this embodiment of the present invention, further, as shown in FIG. 7, the base station may further include a sending unit 65.

The sending unit 65 is configured to support the base station in performing the processes of sending the first signaling, the second signaling, the third signaling, the fourth signaling, the fifth signaling, and the sixth signaling in the embodiments corresponding to FIG. 4 and FIG. 5.

It should be noted that all related content of the operations in the foregoing method embodiments may be cited in function descriptions of corresponding functional modules. Details are not described herein again.

The base station provided in this embodiment of the present invention is configured to perform the foregoing signal transmission method, and therefore can achieve a same effect as the foregoing signal transmission method.

Figure 8:
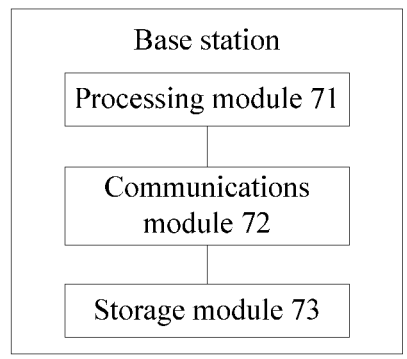
FIG. 8 is a schematic composition diagram of another base station according to an embodiment of the present invention.

When the integrated unit is used, FIG. 8 is another possible schematic composition diagram of the based station in the foregoing embodiments. As shown in FIG. 8, the base station includes: a processing module 71 and a communications module 72.

The processing module 71 is configured to control and manage actions of the base station. For example, the processing module 71 is configured to support the base station in performing operation 404, operation 405, and operation 407 in FIG. 4, and operation 504, operation 505, and operation 507 in FIG. 6; and/or is configured to perform other processes described in this specification. The communications module 72 is configured to support the base station in communicating with another network entity, for example, communicating with a functional module or a network entity shown in FIG. 1, FIG. 3, FIG. 9, or FIG. 10. The base station may further include a storage module 73, configured to store program code and data of a server.

The processing module 71 may be a processor or a controller. The processor or the controller may implement or execute various example logical blocks, modules, and circuits described with reference to content disclosed in the present invention. Alternatively, the processor may be a combination for implementing a computing function, for example, a combination of one or more microprocessors, or a combination of a DSP and a microprocessor. The communications module 72 may be a transceiver, a transceiver circuit, a communications interface, or the like. The storage module 73 may be a memory.

When the processing module 71 is a processor, the communications module 72 is a transceiver, and the storage module 73 is a memory, the base station in this embodiment of the present invention may be the base station shown in FIG. 2.

Figure 9:
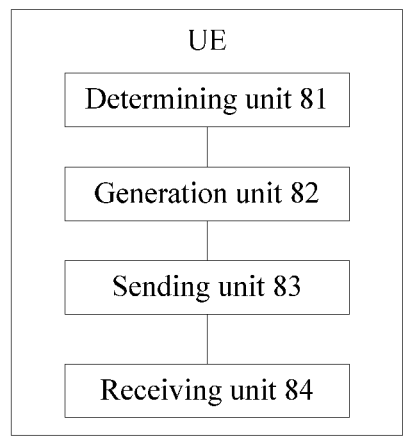
FIG. 9 is a schematic composition diagram of another UE according to an embodiment of the present invention.

When the functional modules are divided based on the corresponding functions, FIG. 9 is a possible schematic composition diagram of the UE in the foregoing embodiments. As shown in FIG. 9, the UE may include: a determining unit 81, a generation unit 82, and a sending unit 83.

The determining unit 81 is configured to support the UE in performing step 401 in the signal transmission method shown in FIG. 4, and operation 501 in the signal transmission method shown in FIG. 6.

The generation unit 82 is configured to support the UE in performing step 402 in the signal transmission method shown in FIG. 4, and operation 502 in the signal transmission method shown in FIG. 6.

The sending unit 83 is configured to support the UE in performing step 403 in the signal transmission method shown in FIG. 4, and operation 503 in the signal transmission method shown in FIG. 6.

Further, as shown in FIG. 9, the UE may further include a receiving unit 84.

The receiving unit 84 is configured to support the UE in performing the processes of receiving the first signaling, the second signaling, the third signaling, the fourth signaling, the fifth signaling, and the sixth signaling in the embodiments corresponding to FIG. 4 and FIG. 5.

It should be noted that all related content of the operations in the foregoing method embodiments may be cited in function descriptions of corresponding functional modules. Details are not described herein again.

The UE provided in this embodiment of the present invention is configured to perform the foregoing signal transmission method, and therefore can achieve a same effect as the foregoing signal transmission method.

Figure 10:
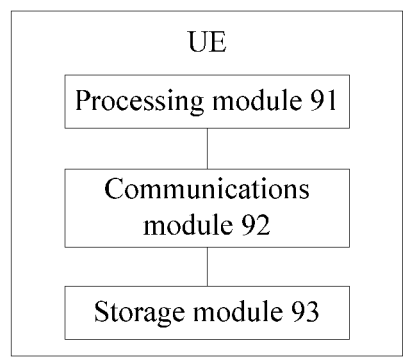
FIG. 10 is a schematic composition diagram of another UE according to an embodiment of the present invention.

When the integrated unit is used, FIG. 10 is another possible schematic composition diagram of the UE in the foregoing embodiments. As shown in FIG. 10, the UE includes: a processing module 91 and a communications module 92.

The processing module 91 is configured to control and manage actions of the UE. The communications module 92 is configured to support the UE in communicating with another network entity, for example, communicating with a functional module or a network entity shown in FIG. 1, FIG. 2, FIG. 7, or FIG. 8. The UE may further include a storage module 93, configured to store program code and data of a terminal.

The processing module 91 may be a processor or a controller. The processor or the controller may implement or execute various example logical blocks, modules, and circuits described with reference to content disclosed in the present invention. Alternatively, the processor may be a combination for implementing a computing function, for example, a combination of one or more microprocessors, or a combination of a DSP and a microprocessor. The communications module 92 may be a transceiver, a transceiver circuit, a communications interface, or the like. The storage module 93 may be a memory.

When the processing module 91 is a processor, the communications module 92 is a transceiver, and the storage module 93 is a memory, the terminal device in this embodiment of the present invention may be the terminal device shown in FIG. 3.

Based on the foregoing descriptions of the implementations, a person skilled in the art may clearly understand that, for ease and brevity of description, division of the foregoing functional modules is merely used as an example for illustration. In actual application, the foregoing functions may be allocated to and implemented by different functional modules depending on a requirement, that is, an inner structure of an apparatus is divided into different functional modules to implement all or some of the functions described above.

In the several embodiments provided in this application, it should be understood that the disclosed apparatuses and methods may be implemented in other manners. For example, the described apparatus embodiments are merely examples. For example, the module or unit division is merely logical function division, and there may be another division manner during actual implementation. For example, a plurality of units or components may be combined or may be integrated into another apparatus, or some features may be ignored or may not be performed. In addition, the shown or discussed mutual couplings or direct couplings or communications connections may be implemented through some interfaces. The indirect couplings or communications connections between the apparatuses or units may be implemented in electrical, mechanical, or other forms.

The units described as separate parts may or may not be physically separated, and parts shown as units may be one or more physical units, may be located in one position, or may be distributed in a plurality of different positions. Some or all of the units may be selected depending on actual requirements, to achieve the objectives of the solutions of the embodiments.

In addition, functional units in the embodiments of the present invention may be integrated into one processing unit, or each of the units may exist alone physically, or two or more units may be integrated into one unit. The integrated unit may be implemented in a form of hardware, or may be implemented in a form of a software functional unit.

When the integrated unit is implemented in the form of the software functional unit and sold or used as an independent product, the integrated unit may be stored in a readable storage medium. Based on such an understanding, the technical solutions in the embodiments of the present invention essentially, or the part contributing to the prior art, or all or some of the technical solutions may be implemented in a form of a software product. The software product is stored in a storage medium and includes several instructions for instructing a device (which may be a single-chip microcomputer, a chip, or the like) or a processor (processor) to perform all or some of the steps in the methods described in the embodiments of the present invention. The storage medium includes any medium that can store program code, such as a USB flash drive, a removable hard disk, a read-only memory (ROM), a random access memory (RAM), a magnetic disk, or an optical disc.

The foregoing descriptions are merely specific implementations of the present invention, but are not intended to limit the protection scope of the present invention. Any variation or replacement within the technical scope disclosed in the present invention shall fall within the protection scope of the present invention. Therefore, the protection scope of the present invention shall be subject to the protection scope of the claims.

What is claimed is:

1. A signal transmission method, comprising:
determining, by user equipment UE, a root indicator q from a sequence indicator set, and a number of root indicators in the sequence indicator set is a positive integer; and
generating, by the UE, an uplink signal based on q and a cyclic shift value, wherein the cyclic shift value is determined based on a cyclic shift value set, and the cyclic shift value set is defined as follows:

$$\left\{(\alpha_0) \bmod N, \ (\alpha_0 + D) \bmod N, \ \ldots, \ \left(\alpha_0 + \left(\left\lfloor \frac{N}{D} \right\rfloor - 1\right)D\right) \bmod N\right\}$$

wherein the cyclic shift value set is determined based on q, D is a positive real number with a value having a corresponding relationship to a value of q, $\alpha_0$ is a real number and is initial cyclic shift information, $\lfloor \ \rfloor$ indicates rounding down, and N is a length of a sequence of the uplink signal; and
sending, by the UE, the uplink signal.

2. The method according to claim 1, further comprising:
receiving, by the UE, first signaling having D; and
determining, by the UE, the cyclic shift value set based on the relationship between D and q.

3. The method according to claim 2, wherein different q is corresponding to different D.

4. The method according to claim 1, further comprising:
receiving, by the UE, second signaling having τ, wherein τ comprises a parameter associated with a maximum delay spread; and determining, by the UE, the cyclic shift value set based on q and τ, wherein D used to determine the cyclic shift value set is a positive real number satisfying $$(2(q\bmod K)n\frac{N}{K}+\tau)\le D;$$

or used to determine the cyclic shift value set is a positive real number satisfying $$(2((K-(q\bmod K)))n\frac{N}{K}+\tau)\le D,$$

wherein τ is a positive real number, n is a positive integer, and K is a length of a Zadoff-Chu (ZC) sequence.

5. The method according to claim 1, further comprising: receiving, by the UE, third signaling having the cyclic shift value set.

6. The method according to claim 1, further comprising: receiving, by the UE, fourth signaling having the initial cyclic shift information.

7. The method according to claim 1, wherein q belongs to a set $\{A_1, B_1, A_2, B_2\}$, $A_i$=i(modK), $B_i$=−i(modK), i is 1 or 2, and K is a length of a Zadoff-Chu (ZC) sequence.

8. A signal receiving method, comprising:
determining, by a base station, a root indicator q from a sequence indicator set, and a number of root indicators in the sequence indicator set is a positive integer;
generating, by the base station, a signal sequence based on q and a cyclic shift value, wherein the cyclic shift value is determined based on a cyclic shift value set, and the cyclic shift value set is as follows:

$$\{(\alpha_0)\bmod N, (\alpha_0+D)\bmod N, \ldots, (\alpha_0+(\lfloor\frac{N}{D}\rfloor-1)D)\bmod N\}$$

wherein the cyclic shift value set is determined based on q, D is a positive real number with a value having a corresponding relationship to a value of q, $\alpha_0$ is a real number and is initial cyclic shift information, ⌊ ⌋ indicates rounding down, and N is a length of a sequence of the uplink signal;
receiving, by the base station, the uplink signal; and
processing, by the base station, the uplink signal based on the signal sequence.

9. The method according to claim 8, further comprising: sending, by the base station, first signaling having D.

10. The method according to claim 9, wherein different q is corresponding to different D.

11. The method according to claim 8, further comprising: sending, by the base station, second signaling having τ, wherein τ comprises a parameter associated with a maximum delay spread and is used by user equipment UE to determine the cyclic shift value set, wherein D used to determine the cyclic shift value set is a positive real number satisfying $$(2(q\bmod K)n\frac{N}{K}+\tau)\le D;$$

or

D used to determine the cyclic shift value set is a positive real number satisfying $$(2((K-(q\bmod K)))n\frac{N}{K}+\tau)\le D,$$

wherein τ is a positive real number, n is a positive integer, and K is a length of a Zadoff-Chu (ZC) sequence.

12. The method according to claim 8, further comprising: sending, by the base station, third signaling having the cyclic shift value set.

13. The method according to claim 8, further comprising: sending, by the base station, fourth signaling having the initial cyclic shift information.

14. The method according to claim 8, wherein q belongs to a set $\{A_1, B_1, A_2, B_2\}$, $A_i$=i(modK), $B_i$=−i(modK), i is 1 or 2, and K is a length of a Zadoff-Chu (ZC) sequence.

15. User equipment (UE), comprising:
a memory; and
at least one processor, coupled with the memory, configured to:
determine a root indicator q from a sequence indicator set, and a number of root indicators in the sequence indicator set is a positive integer;
generate an uplink signal based on q and a cyclic shift value determined based on a cyclic shift value set, and the cyclic shift value set is defined as follows:

$$\{(\alpha_0)\bmod N, (\alpha_0+D)\bmod N, \ldots, (\alpha_0+(\lfloor\frac{N}{D}\rfloor-1)D)\bmod N\}$$

wherein the cyclic shift value set is determined based on q, D is a positive real number with a value having a corresponding relationship to a value of q, $\alpha_0$ is a real number and is initial cyclic shift information, ⌊ ⌋ indicates rounding down, and N is a length of a sequence of the uplink signal; and
a transceiver, coupled with the processor, configured to send the generated uplink signal.

16. The UE according to claim 15, further comprising:
the transceiver configured to receive first signaling having D; and
the processor further configured to determine the cyclic shift value set based on the relationship between D received by the receiving unit and q.

17. The UE according to claim 16, wherein different q is corresponding to different D.

18. The UE according to claim 15, further comprising:
the transceiver configured to receive second signaling having τ, wherein τcomprises a parameter associated with a maximum delay spread; and
the processor further configured to determine the cyclic shift value set based on q and τ, wherein
D used to determine the cyclic shift value set is a positive real number satisfying $$(2(q\bmod K)n\frac{N}{K}+\tau)\le D;$$

or
used to determine the cyclic shift value set is a positive real number satisfying $$\left(2((K-(q \bmod K)))n\frac{N}{K}+\tau\right) \le D,$$

wherein τ is a positive real number, n is a positive integer, and K is a length of a Zadoff-Chu (ZC) sequence.

19. The UE according to claim 15, further comprising the transceiver configured to receive third signaling, wherein the third signaling comprises the cyclic shift value set.

20. The UE according to claim 16, further comprising the transceiver further configured to receive fourth signaling having the initial cyclic shift information.

* * * * *